(12) United States Patent
Peng et al.

(10) Patent No.: US 6,370,050 B1
(45) Date of Patent: Apr. 9, 2002

(54) ISOLATED AND SOFT-SWITCHED POWER CONVERTER

(75) Inventors: Fang Zheng Peng; Donald Joe Adams, both of Knoxville, TN (US)

(73) Assignee: UT-Batelle, LLC, Oak Ridge, TN (US)

( * ) Notice: Subject to any disclaimer, the term of this patent is extended or adjusted under 35 U.S.C. 154(b) by 0 days.

(21) Appl. No.: 09/399,397

(22) Filed: Sep. 20, 1999

(51) Int. Cl.[7] .......................... H02M 3/24; H02M 3/335
(52) U.S. Cl. ........................................ 363/98; 363/17
(58) Field of Search .................... 363/98, 132, 127, 363/41, 58, 37, 16, 17

(56) References Cited

U.S. PATENT DOCUMENTS

| | | | | |
|---|---|---|---|---|
| 4,523,269 A | * | 6/1985 | Baker et al. ................. | 363/138 |
| 4,953,068 A | * | 8/1990 | Henze .......................... | 363/17 |
| 5,027,264 A | * | 6/1991 | DeDoncker et al. .......... | 363/16 |
| 5,172,309 A | | 12/1992 | DeDoncker et al. | |
| 5,255,174 A | | 10/1993 | Murugan | |
| 5,559,685 A | | 9/1996 | Lauw et al. | |

FOREIGN PATENT DOCUMENTS

WO  WO 99/22438  5/1999

OTHER PUBLICATIONS

"A Three–Phase Soft–Switched High–Power–Density dc/dc Converter for High–Power Applications," by DeDoncker et al., *IEEE Transactions on Industry Applications*, vol. 27, No. 1, Jan./Feb. 1991, pp. 63–73.

"Design Considerations for High Power Density DC/DC Converters," by Kheraluwala et al., *HFPC*, May 1990 Proceedings, pp. 324–335.

"A Novel Control Principle of Bi–Directional DC–DC Power Conversion," by Reimann et al., *IEEE Proceedings*, 1997, IEEE Document 0–7803–3840–5/97, pp. 978–984.

"Bi–Directional DC to DC Converters for Fuel Cell Systems," by Wang et al., *IEEE Proceedings*, 1998, IEEE Document 0–7803–4398–0/98, pp. 47–51.

"The Auxiliary Quasi–Resonant DC Link Inverter," by DeDoncker et al., *PESC '91 Record*, 22$^{nd}$ Annual IEEE Power Electronics Specialists Conference, Jun. 1991, Boston, Mass., pp. 248–253.

"A PWM Method for Quasi–Resonant Zero–Voltage–Switching Inverter," by Taniguchi et al., The European Power Electronics Association, 1993, pp. 41–45.

* cited by examiner

*Primary Examiner*—Rajnikant B. Patel
(74) *Attorney, Agent, or Firm*—Kilpatrick Stockton

(57) ABSTRACT

An isolated and soft-switched power converter is used for DC/DC and DC/DC/AC power conversion. The power converter includes two resonant tank circuits coupled back-to-back through an isolation transformer. Each resonant tank circuit includes a pair of resonant capacitors connected in series as a resonant leg, a pair of tank capacitors connected in series as a tank leg, and a pair of switching devices with anti-parallel clamping diodes coupled in series as resonant switches and clamping devices for the resonant leg. The power converter is well suited for DC/DC and DC/DC/AC power conversion applications in which high-voltage isolation, DC to DC voltage boost, bidirectional power flow, and a minimal number of conventional switching components are important design objectives. For example, the power converter is especially well suited to electric vehicle applications and load-side electric generation and storage systems, and other applications in which these objectives are important. The power converter may be used for many different applications, including electric vehicles, hybrid combustion/electric vehicles, fuel-cell powered vehicles with low-voltage starting, remote power sources utilizing low-voltage DC power sources, such as photovoltaics and others, electric power backup systems, and load-side electric storage and generation systems.

31 Claims, 24 Drawing Sheets

FROM TIME = $t_3$ UNTIL TIME = $t_4$

FROM TIME = $t_4$ UNTIL TIME = $t_5$

ISOLATED AND SOFT-SWITCHED POWER CONVERTER

The United States Government has rights in this invention pursuant to contract no. DE-AC05-96OR22464 between the United States Department of Energy and Lockheed Martin Energy Research Corporation.

TECHNICAL FIELD

This invention relates to electric power converters and, more particularly, relates to an isolated and soft-switched power converter having two resonant tank circuits coupled back-to-back through an isolation transformer. The invention also relates to electric power storage and generation systems and electric vehicles using the converter.

BACKGROUND OF THE INVENTION

Soft switching techniques have been used in power converters to reduce switching losses and alleviate electromagnetic interference (EMI). For example, soft switching techniques can be particularly important in electric power applications involving DC/AC and DC/DC power conversion and relatively large power requirements, such as electric vehicle, hybrid electric vehicle, and electric power storage and generation systems. In electric vehicle applications, for example, the power controller for the electric motor uses frequency control, phase control, pulse control, and other types of power supply manipulation to smoothly control the power output of the electric motor. This type of power supply manipulation requires a high rate of switching in the power controller to generate the precisely-controlled power supply waveforms to drive the electric motor.

If this switching occurs in the power controller when current is flowing through or voltage is applied across the switching element (i.e., "hard switching"), the resulting switching losses in the power controller decrease the efficiency of the vehicle's power plant, the high voltage rise rate (dV/dt) may damage the motor, and the resulting voltage change rate can cause additional losses and overheating in the electric motor, as well as interfering with the operation of other electrical systems. Switching with zero current flowing through or zero voltage across the switching element, which is known as "soft switching," alleviates these problems. Obtaining soft-switching can be difficult, however, because it requires repeatedly driving the voltage across or forcing the current through the switching element to zero, and then holding the voltage or current at this zero level long enough for the switching element to physically switch. Because an AC voltage wave periodically passes through a zero-voltage state, but does not remain at the zero-voltage state for an extended period, the switching element may not have enough time to physically switch while the voltage transitions through the zero-voltage state.

The need to switch during zero-voltage and/or zero-current states or transitions sets the stage for the basic soft switching design objectives. The voltage across each switching element should repeatedly obtain zero-voltage and/or zero-current periods long enough for the element to soft switch, or looked at from the other direction, the switching elements must be capable of switching fast enough to soft switch during the zero-voltage and/or zero-current transitions. As another design concern, the cost of the switching elements increase with increasing power transmission capability and switching speeds.

Electric vehicle or hybrid electric vehicle designs also have other important objectives, including physical and electrical isolation of high-voltage circuits and components (e.g., the electric drive system) from the low-voltage system. Another important objective is bidirectional operation of the power converter so that the automotive battery, which is used to start the vehicle, can be recharged during vehicle operation. Electric or hybrid electric vehicles typically use a relatively low-voltage DC automotive electrical system (e.g., about 12 Volts or 36 Volts), and a relatively high-voltage DC electrical system for the electric motor that drives the vehicle (e.g., about 300 Volts). Thus, the typical electric or hybrid electric vehicle application calls for a bidirectional DC/DC power converter with high-voltage isolation. Certain load-side electric generation applications, such as battery storage peak shaving, also require bidirectional DC/DC power conversion.

Because DC voltage cannot be increased without intermediate conversion to an alternating voltage, and the underlying automotive battery operates at a relatively low DC voltage, the DC/DC power converter for an electric or hybrid electric vehicle implements the steps of DC/AC conversion at low voltage, AC/AC voltage boost through an AC transformer, and AC/DC conversion at high-voltage. Accordingly, the DC/AC and AC/DC conversion steps involve switching in the inversion and rectification processes which, if uncontrolled, can generate large switching losses and EMI. In addition, subsequent inversion of the high-voltage DC output, typically in the power controller or inverter for the electric motor, can generate large switching losses and EMI.

Conventional bidirectional DC/DC power converters developed for hybrid electric vehicle and other applications have a number of disadvantages. Specifically, two separate full-bridge converters are needed to utilize the full DC voltage in the power conversion. That is, a first full-bridge converter is needed for the DC/AC conversion, and a second full-bridge converter is needed for the subsequent AC/DC conversion. This requires an excessive number of components in the duplicate full-bridge converters. In addition, transformer leakage can result in voltage surges, power losses, and control difficulties.

Furthermore, some conventional DC/DC power converter designs require a clamping or snubber circuit to provide a DC current path through an inductor for limiting voltage surge during switching. These circuit designs also experience hard-switching related problems, such as high EMI and high voltage rise rates, which require sophisticated filters and shielding. Moreover, for traditional DC/DC/AC power conversion, these circuit designs require two separate stages (DC/DC and DC/AC power conversion), which further duplicate parts without synergy.

In general, conventional DC/DC and DC/DC/AC power converters typically provide an output voltage that is equal to or less than the voltage available from the internal DC power supply. For safety considerations, manufacturers of electric drive systems in products for general distribution, such as electric vehicles, would prefer to have power distribution busses operate at no more than 50 Volts. But lower voltage motors are inherently larger and heavier than higher voltage motors delivering equivalent power, because lower voltage motors must be made with copper wire that is large enough to safely handle the higher current required for equivalent power delivery at a lower voltage.

These conflicting design objectives create serious design constraints and unresolved problems for the designers of power converters. Thus, there is a need in the art for improved DC/DC and DC/DC/AC converters for many applications, including hybrid electric vehicles and electric utility applications, such as remote load-side electric power generation. In particular, there is a need for a soft switched power converter that isolates high-voltage components, uses conventional switching devices, exhibits stable voltage control, alleviates EMI production, and avoids unnecessary duplication of components.

SUMMARY OF THE INVENTION

The present invention meets the needs described above in an isolated and soft-switched power converter for DC/DC and DC/DC/AC power conversion. The power converter utilizes the full DC voltage of internal voltage sources in both the positive and negative polarities for intermediate AC/AC transformation, with a minimum number of switching devices and other electric components. The power converter also repeatedly maintains zero-voltage periods across its switching elements to allow low-stress soft switching by conventional switching elements. That is, the power converter provides extended zero-voltage switching periods to allow soft switching by conventional switching devices, rather than relying on very fast switching during very short or transient zero-voltage periods. These attributes provide the advantages of economic construction and ready-availability of the required components.

The power converter produces bidirectional DC/DC and DC/DC/AC power conversion, and also produces a quasi-DC output voltage that repeatedly obtains sustained zero-voltage periods for soft switching by subsequent components, such as an electric vehicle power controller. The power converter also provides electrical and physical isolation of high-voltage components, soft-switching to all internal switching devices, bidirectional power flow between the input and output, and good voltage control. In addition, alternative designs may further minimize the number of components, for example in a unidirectional power converter, and by relying on stray capacitance in switching and clamping devices and/or leakage and self inductance in the isolation transformer in lieu of discrete capacitors and/or inductors.

In an electric or hybrid electrical vehicle application, the power converter solves the competing design objectives of a high-voltage drive motor and a low-voltage distribution system by physically and electrically isolating the low-voltage distribution system from the high-voltage electric drive. For example, the low-voltage automotive electrical system typically operates at about 12 Volts DC, 36 Volts DC, or both, whereas the high-voltage drive electric typically operates at about 300 Volts DC. In load-side electric generation applications, the high-voltage side may operate at 240 or 480 Volts for industrial/commercial backup systems, and at 12 or 25 kV for utility generators, such as peak load shaving and energy storage equipment.

The invention also provides these solutions in a cost-effective manner, using a minimal number of conventional switching devices. In an electric vehicle application, the power converter invention allows a low-voltage distribution system to supply power to an adjustable speed drive that incorporates an isolated boost converter to output medium- to high-voltage AC power with soft switching of all devices. Further, the inverter can be designed so that it is enclosed with the drive motor so that the isolated high-voltage components are never exposed outside the case.

The circuit configuration of the power converter includes two resonant tank circuits coupled back-to-back through an isolation transformer. Each resonant tank circuit may consist of a pair of resonant capacitors connected in series as a resonant leg, a pair of tank capacitors connected in series as a tank leg, and a pair of switching devices with anti-parallel clamping diodes coupled in series as resonant switches and clamping devices for the resonant leg. Thus, the power converter uses far fewer switching devices as compared with the traditional bidirectional isolated power converters. As a result, the power converter is well suited for DC/DC and DC/DC/AC power conversion applications in which high-voltage isolation, DC to DC voltage boost, bidirectional power flow, and a minimal number of conventional switching components are important design objectives. For example, the power converter is especially well suited to electric and hybrid electric vehicle applications, load-side electric generation and storage systems, and other applications in which these objectives are important.

Generally described, the invention includes an isolated and soft-switched power converter including two resonant tank circuits coupled back-to-back through an isolation transformer. Each resonant tank circuit includes a pair of resonant capacitors present in series as a resonant leg, a pair of tank capacitors connected in series as a tank leg, and a pair of switching devices coupled in series as resonant switches and voltage clamping device for the resonant leg. The power converter also includes a switching controller operable for gating the switching devices to cause a resonant voltage to resonate in each resonant leg. In addition, the resonant voltage repeatedly obtains zero-voltage periods for soft-switching a device powered by the converter. The switching controller also gates the switching devices during zero-current and/or zero-voltage conditions for soft switching the switching devices of each resonant tank circuit.

The invention also includes a hybrid electric/combustion engine vehicle including the power converter described above. The hybrid vehicle includes an automotive battery electrically connected to the primary resonant tank circuit, and a low-voltage automotive electrical system electrically connected to the automotive battery. The hybrid vehicle also includes a combustion engine, an electric motor, and a power controller connected to the secondary resonant tank circuit. The power controller provides a controlled power input to the electric motor in response to an accelerator signal received from an operator of the vehicle. A mechanical transmission driven by the combustion engine and the electric motor rotationally drives wheels to transport the vehicle. In addition, the power converter operates to deliver electric power from the automotive battery to the electric motor during acceleration and relatively low speed vehicle transportation or as determined by the vehicle's operational strategy controller. The power converter also operates to deliver electric power from the electric motor to the automotive battery during deceleration and during periods of low propulsion power demands.

In another alternative, the invention includes a fuel-cell powered electric vehicle including the power converter. The fuel-cell automobile includes a battery electrically connected to the primary resonant tank circuit and a low-voltage automotive electrical system electrically connected to the automotive battery. The fuel-cell automobile also includes a fuel cell, a compressor, and a traction-drive motor with their respective power controllers electrically connected to the secondary resonant tank circuit.

The traction motor's power controller provides controlled power input to the electric motor in response to an accelerator signal received from an operator of the vehicle. A mechanical transmission driven by the electric motor rotationally drives wheels to transport the vehicle. In addition, the compressor's power converter operates to deliver electric power from the low-voltage automotive battery to the high-voltage compressor during start-up of the fuel cell. The power converter also operates to deliver electric power from the fuel cell to the automotive battery during operation of the fuel cell.

For example, in a typical configuration, the automotive electrical system may operate at about 12 Volts DC or about 36 Volts DC, the fuel cell may operate at about 300 Volts DC, and the power converter may operate at a resonant frequency in the range of about 10 kHz to 100 kHz.

In another application, the invention includes an electric storage and generation system using the power converter. The system includes a battery storage unit connected to the low side of the power converter, and an inverter/rectifier connected to the high side of the power converter. The inverter/rectifier, in turn, connects the system through a conventional transformer to an electric power grid. In another alternative, the battery is charged through a remote generator, such as a photovoltaic (PV) panel. In this case, the power flow may be unidirectional into the power grid. As another option, the PV panel or another type of remote DC power generator may be connected directly to the low side of the power converter.

More specifically described, the power converter includes an isolation transformer having a primary input node, a primary output node, a secondary input node, and a secondary output node. The power converter also includes a primary resonant tank circuit having a primary top rail, a primary center rail, and a primary bottom rail. In addition, the primary resonant tank circuit includes a first primary resonant capacitance present between the primary top rail and the primary center rail, a second primary resonant capacitance present between the primary center rail and the primary bottom rail, and a first primary resonant switch connected between the primary top rail and the primary center rail.

The primary resonant tank circuit also includes a second primary resonant switch connected between the primary center rail and the primary bottom rail, a first primary clamping diode connected between the primary high-voltage rail and the primary center rail, and a second primary clamping diode connected between the primary center rail and the primary bottom rail. The primary resonant tank circuit further includes a first primary tank capacitor connected between the primary top rail and a primary tap node, and a second primary tank capacitor connected between the primary tap node and the primary bottom rail. In addition, the primary center rail is connected to the primary input node of the isolation transformer, and the primary tap node is connected to the primary output node of the isolation transformer.

The power converter also includes a secondary resonant tank circuit including a secondary top rail, a secondary center rail, and a secondary bottom rail. The secondary resonant tank circuit includes a first secondary resonant capacitance present between the secondary top rail and the secondary center rail, a second secondary resonant capacitance present between the secondary center rail and the secondary bottom rail, and a first secondary clamping diode connected between the secondary top rail and the secondary center rail. The secondary resonant tank circuit also includes a first secondary tank capacitor connected between the secondary top rail and a secondary tap node, and a second secondary tank capacitor connected between the secondary tap node and the secondary bottom rail. The secondary center rail is connected to the secondary input node of the isolation transformer, and the secondary tap node is connected to the secondary output node of the isolation transformer.

The secondary resonant tank circuit of the power converter may also include a second secondary clamping diode connected between the secondary center rail and the secondary bottom rail. The secondary resonant tank circuit may also include a first secondary resonant switch connected between the secondary top rail and the secondary center rail, and a second secondary resonant switch connected between the secondary center rail and the secondary bottom rail.

The power converter may also include a primary bottom-rail terminal connected to the primary bottom rail for connection to a low-potential terminal of a DC voltage source, and a primary center-rail terminal for connection to a high-potential terminal of the DC voltage source. The power converter may also include an inductor connected in series between the primary center-rail terminal and the primary center rail. Alternatively or additionally, the power converter may include a resonant inductor connected between the primary input node of the isolation transformer and the primary output node of the isolation transformer.

The power converter also includes a switching controller operable for gating the first and second primary switches to cause a primary resonant voltage to resonate between the first primary resonant capacitance and the second primary resonant capacitance, and a secondary resonant voltage to resonate between the first secondary resonant capacitance and the second secondary resonant capacitance. The secondary resonant voltage repeatedly obtains zero-voltage periods for soft-switching a device connected between the secondary center rail and the secondary bottom rail. In addition, the switching controller is operable for soft switching the first and second primary resonant switches by gating the first resonant switch during current conduction by the first clamping diode, and by gating the second resonant switch during current conduction by the second clamping diode.

In one configuration, the first primary resonant capacitance includes a discrete electrical capacitor connected between the primary top rail and the primary center rail, and the second primary resonant capacitance includes a discrete electrical capacitor connected between the primary center rail and the primary bottom rail. In an alternative configuration, the first primary resonant capacitance consists essentially of stray capacitance inherently present in the first primary resonant switch and the first primary clamping diode, and the second primary resonant capacitance consists essentially of stray capacitance inherently present in the second primary resonant switch and the second primary clamping diode.

Similarly, the first secondary resonant capacitance may include a discrete electrical capacitor connected between the secondary top rail and the secondary center rail, and the second secondary resonant capacitance may include a discrete electrical capacitor connected between the secondary center rail and the secondary bottom rail. Alternatively, the first secondary resonant capacitance may consist essentially of stray capacitance inherently present in the first secondary clamping diode and the second secondary resonant capacitance may consist essentially of stray capacitance inherently present in the second secondary clamping diode.

The invention also includes a hybrid electric and combustion engine powered vehicle including the power converter described above. This hybrid vehicle includes an automotive battery having a high-potential terminal electrically connected to the primary center-rail terminal of the power converter. The battery also has a low-potential terminal electrically connected to the primary bottom-rail terminal of the power converter. The hybrid vehicle also includes a low-voltage automotive electrical system electrically connected to the automotive battery, a combustion engine, and an electric motor. The power controller is connected to the secondary resonant tank circuit, and provides a controlled power input to the electric motor in response to an accelerator signal received from an operator of the vehicle. The hybrid vehicle also includes a mechanical transmission driven by the combustion engine and the electric motor. The transmission rotationally drives wheels to transport the vehicle in response to rotational power delivered by the combustion engine and the electric motor. In addition, the power converter operates to deliver electric power from the automotive battery to the electric motor during acceleration and relatively low speed vehicle transportation or as determined by the vehicle's operational strategy controller. The power converter also operates to deliver electric power from the electric motor to the automotive battery during deceleration and during periods of low propulsion power demands.

The power controller in the hybrid vehicle may include a variable-frequency inverter connected across the secondary center rail and the secondary bottom rail. In this case, the variable-frequency inverter receives a quasi-DC supply voltage, which allows the inverter to soft-switch during the zero-voltage periods occurring between the secondary center rail and the secondary bottom rail. In a hard-switching alternative, the power controller includes a variable-frequency inverter connected across the secondary top rail and the secondary bottom rail. In this case, the variable-frequency inverter receives a relatively constant DC supply voltage.

The invention also includes a fuel-cell powered electric vehicle including the previously-described electric power converter. This fuel-cell powered vehicle includes an automotive battery having a high-potential terminal electrically connected to the primary center-rail terminal of the power converter. The battery also has a low-potential terminal electrically connected to the primary bottom-rail terminal of the power converter. The fuel-cell powered vehicle also includes a low-voltage automotive electrical system electrically connected to the automotive battery. The fuel-cell powered vehicle also includes a fuel cell electrically connected across the secondary top rail and the secondary bottom rail of the secondary resonant tank circuit, and a compressor electrically connected across the secondary top rail and the secondary bottom rail of the secondary resonant tank circuit. This compressor is configured to deliver compressed gas, such as air or a hydrogen and air mixture, to the fuel cell.

The fuel-cell powered vehicle also includes an electric traction motor and a power controller connected to the secondary resonant tank circuit and providing a controlled power input to the electric traction motor in response to an accelerator signal received from an operator of the vehicle. A mechanical transmission driven by the electric motor is configured to rotationally drive wheels to transport the vehicle. In addition, the power converter operates to deliver electric power from the automotive battery to the compressor during start-up of the fuel cell. The power converter also operates to deliver electric power from the fuel cell to the automotive battery during operation of the fuel cell.

The power controller in the fuel-cell powered vehicle may include a variable-frequency inverter, connected across the secondary center rail and the secondary bottom rail, which soft-switches during the zero-voltage periods occurring between the secondary center rail and the secondary bottom rail. Alternatively, the power controller may include a variable-frequency inverter connected across the secondary top rail and the secondary bottom rail. That the invention improves over the drawbacks of prior art power converters and accomplishes the advantages described above will become apparent from the following detailed description and the appended drawings and claims.

DETAILED DESCRIPTION OF EMBODIMENTS OF THE INVENTION

The present invention may be embodied in a power converter for many different applications. For example, the power converter may be incorporated into electric vehicles, hybrid combustion engine/electric vehicles, fuel-cell powered vehicles with low-voltage starting, remote power sources utilizing low-voltage DC power sources (such as photovoltaics and others), electric power backup systems, and load-side electric storage and generation systems. Embodiments of the invention include a number of different converter designs, including bidirectional and unidirectional options, alternatives using discrete and stray resonant capacitances, and alternatives using discrete inductors and the leakage and self inductance in the isolation transformer as resonant inductances. Specific examples illustrating the invention include a hybrid combustion/electric vehicle, a fuel-cell powered vehicle, an electric generation system, and an electric storage and generation system.

Those skilled in the art will appreciate that the specific electrical components described below may be replaced by equivalent devices presently available or developed in the future. In addition, the resonant frequency of the power converter, the input and output voltages, and the specific values of the various electric components are all variables that may be adjusted by those skilled in the art to obtain power converters for other specific applications. For example, higher voltage converters may be appropriate for marine and electric utility applications, higher frequency converters may be appropriate for aerospace applications, and so forth.

Figure 1A:
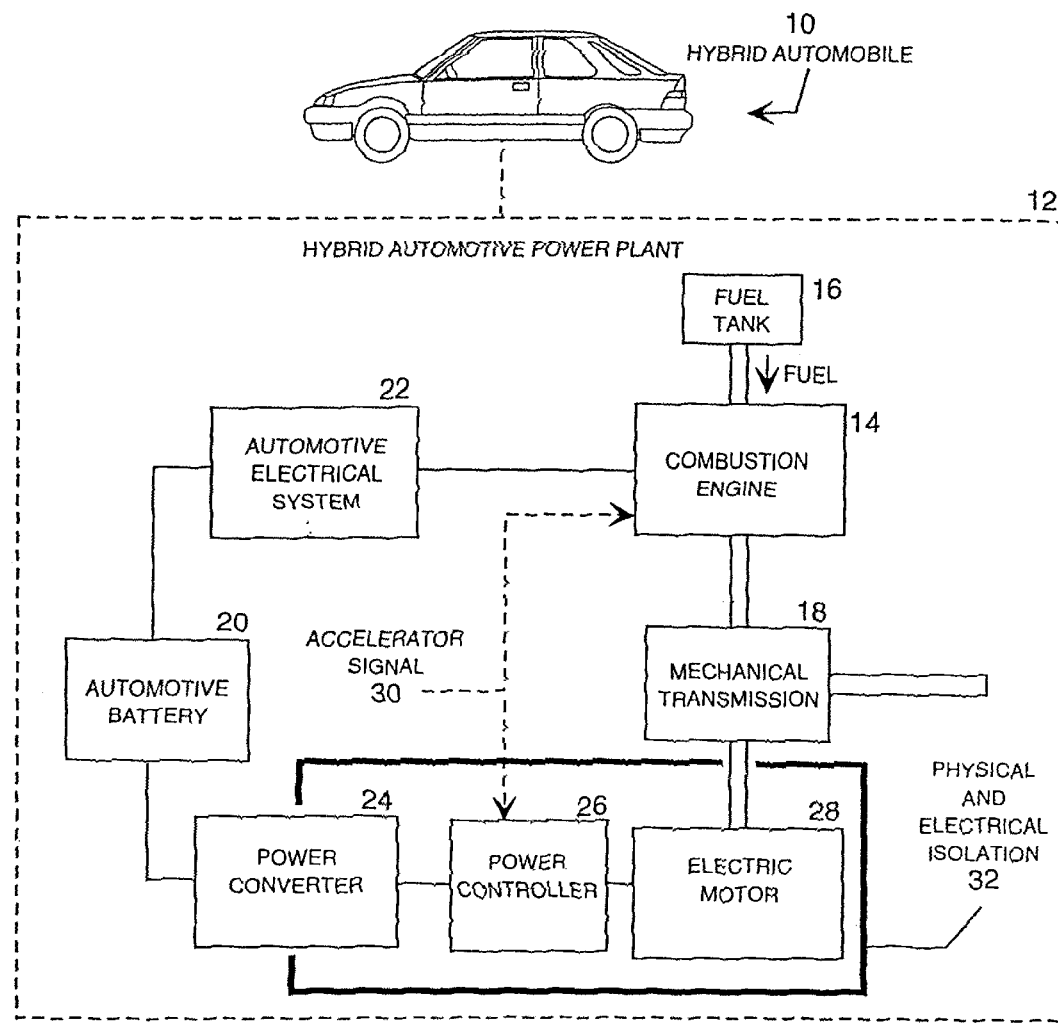
FIG. 1A is a functional block of a hybrid combustion/electric vehicle.

Turning now to the figures, in which like numerals indicate like elements throughout the several figures, FIG. 1A is a functional block of a hybrid combustion/electric vehicle 10. Although the vehicle is shown as car, it should be understood that other vehicles, such as busses, boats, trucks, trains, construction equipment, and other types of vehicles may be configured to operate in accordance with the same principles. Because the vehicle may be conventional in aspects other than its power plant, these aspects of the vehicle 10 will not be further described.

The vehicle 10 includes a power plant 12 including a combustion engine 14 and an associated fuel tank 16. The combustion engine 14 drives a mechanical transmission 18 to transport the vehicle in the usual manner. The vehicle 10 also includes a typical 12 Volt DC or a typical 36 Volt DC electric vehicle automotive battery 20 that supplies a typical 12 Volt DC or a typical 36 Volt DC automotive electrical system. The electric vehicle automotive battery 20 is designed to provide a supplemental power source for the vehicle 10. These aspects of the vehicle 10 are similar to those in conventional automobiles, except that the combustion engine 14 may be smaller and less expensive than a typical engine in a combustion-engine-only vehicle with similar performance characteristics. Similarly, the battery 20 may be significantly smaller and less expensive than those in electric-only vehicles. In addition, the battery systems for electric vehicles are expected to continue to develop and improve significantly in the near future, producing smaller, lighter weight, longer lasting, and more powerful batteries.

As a hybrid, the vehicle 10 also includes a power converter 24 connected on the low-voltage (primary) side to the automotive battery 20, and on the high-voltage (secondary) side to power controller 26, which in turn controls the output of an electric traction motor 28. The power controller 26 drives the electric motor 30 in response to an accelerator signal 30, which is also supplied to the combustion engine 14. The vehicle 10 also includes electric and physical isolation 32 for the high-voltage components, including the high-voltage side of the power converter 24, the power controller 26, and the electric motor 30.

The power controller 26 may utilize a number of drive techniques to smoothly control the power output of the electric traction motor 28, including frequency control, phase control, pulse control, combinations of these approaches, and other techniques. It is anticipated that the technology of the power controller 26 will continue to develop as electric vehicles are increasingly deployed. An illustrative power controller 26 is described in U.S. Pat. No. 5,081,365 to Field and Bricher entitled "Electric Hybrid Vehicle and Method of Controlling It," which is incorporated herein by reference.

Figure 1B:
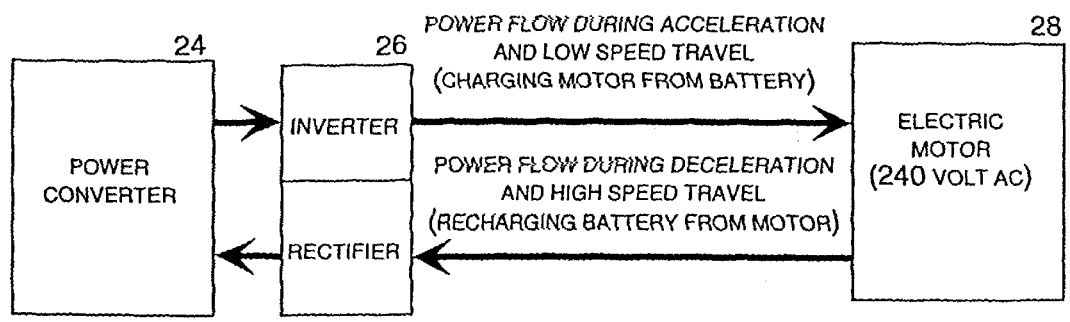
FIG. 1B is a functional block of power flow between a power converter and an electric motor in the hybrid vehicle of FIG. 1A.

FIG. 1B is a functional block of the bidirectional power flow between the power converter 24 and the electric traction motor 28 in the hybrid vehicle 10. Basically, the electric traction motor 28 operates as a supplemental power source for the combustion engine 14 to supply additional power as determined by the vehicle's operational strategy controller. This allows the combustion engine 14 to be smaller and less expensive than in a comparable combustion-only power plant. In addition, the hybrid vehicle 10 experiences increased combustion efficiency because the electric traction motor 28 kicks in during acceleration and low-speed operation, when the combustion engine 14 is operating at relatively low efficiency.

To allow the vehicle 10 to operate in this manner, during acceleration and low-speed operation the power controller 26 acts as an inverter by converting the DC or quasi-DC output from the power converter 24 into an AC supply voltage for the electric traction motor 28. When the vehicle is operating at a relatively constant speed in an efficient range for the engine 14, and particularly during deceleration, the electric traction motor 28 generates excess electric energy, which is used to recharge the battery 20. Thus, during steady-state operation and especially during deceleration, the power controller 26 acts as a rectifier by converting the AC output from the motor 28 to a DC power source for the power converter 24. Alternatively, the vehicle may be operated without the engine at low speed power, propelled only by the electric motor and the batteries.

Figure 2A:
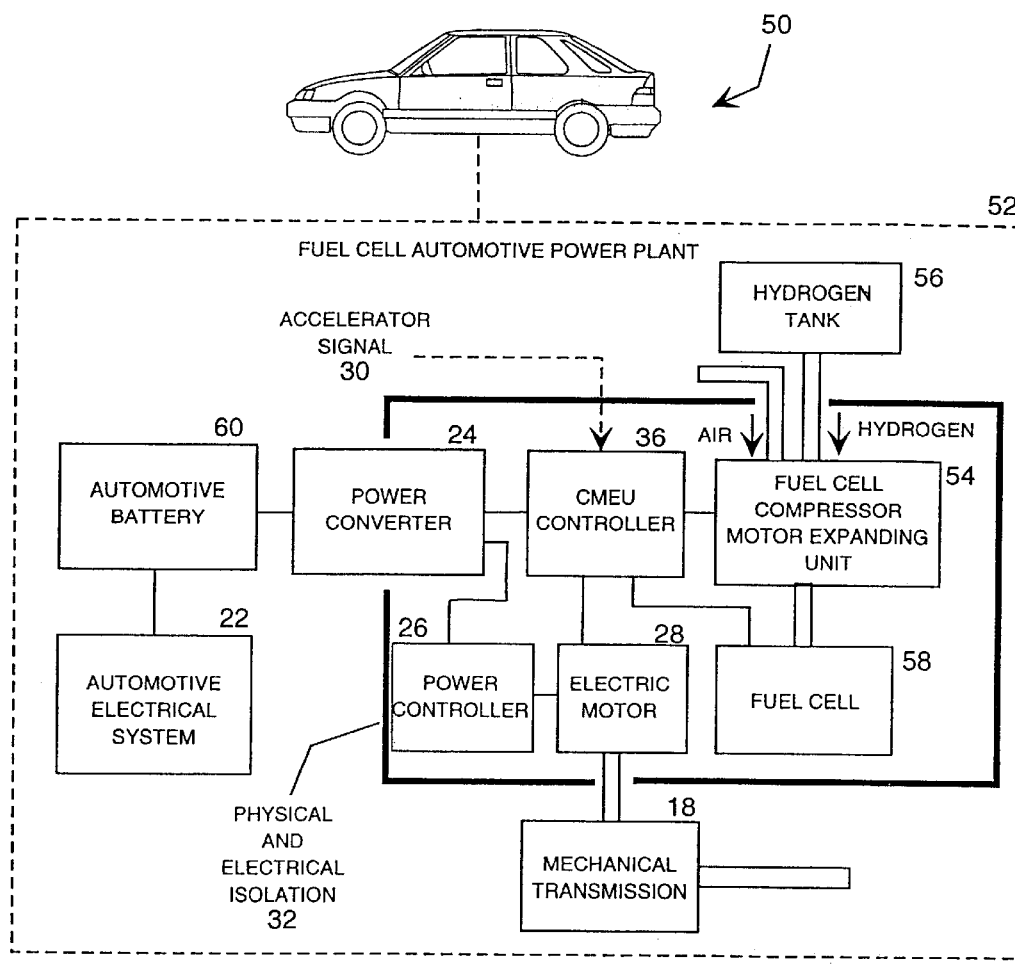
FIG. 2A is a functional block of a fuel-cell powered electric vehicle.

FIG. 2A is a functional block of a fuel-cell powered electric vehicle 50. Again the vehicle is shown as car, but other vehicles, such as busses, boats, trucks, trains, construction equipment, and other types of vehicles may be configured to operate in accordance with the same principles. Because the vehicle may be conventional in aspects other than its power plant, these aspects of the vehicle 50 will not be further described.

The vehicle 50 includes a power plant 52 including a fuel cell 58 and an associated hydrogen tank 56. Although acceptable technology for the fuel cell 58 is known, it is anticipated that this technology will continue to develop and improve significantly in the near future, producing smaller, lighter weight, longer lasting, and more powerful fuel cells. In this regard, the fuel cell may be any type of suitable electric generation reactor, whether known at present or developed in the future. A suitable fuel cell is described in U.S. Pat. No. 5,193,635 to Mizuno, et al. entitled "Vehicle With Fuel Cell System," which is incorporated herein by reference.

The fuel cell 58 is energized by a compressor 54, also known as a compressor motor expanding unit ("CMEU"), which injects compressed gas, such as air or a hydrogen and air mixture, into the fuel cell 58. A battery 60, connected through the power converter 24, runs the compressor 54 until the fuel cell 58 reaches the operating voltage. Once the fuel cell 58 is running, it energizes a DC bus. A CMEU controller 36 is connected to the DC bus, and a power controller 26 drives an electric traction motor 28, which in turn drives a mechanical transmission 18 to transport the vehicle in the usual manner. The vehicle 50 also includes a typical 12 Volt DC or 36 Volt DC automotive battery 60 that supplies a typical 12 Volt DC or 36 Volt DC automotive electrical system 22. Although the automotive battery 60 may be conventional, a somewhat heavier-duty battery than those found in typical automobiles may be desirable to provide additional power for starting the fuel cell. Because these aspects of the vehicle 50 are similar to those in conventional vehicles, they will not be described further.

The power converter 24 is connected on the low-voltage (primary) side to the automotive battery 60, and on the high-voltage (secondary) side to CMEU controller 36 and power controller 26, which in turn controls the output of an electric traction motor 28. The power controller 26 drives the electric traction motor 28 in response to an accelerator signal 30. The same power controller 26 for the electric traction motor 28 described with reference to FIGS. 1A and 1B may be used in the fuel-cell powered vehicle 50. The vehicle 50 also includes electrical and physical isolation 32 for the high-voltage components, including the high-voltage (secondary) side of the power converter 24, the power controller 26, the compressor 54, the fuel cell 58, and the electric traction motor 28.

Figure 2B:
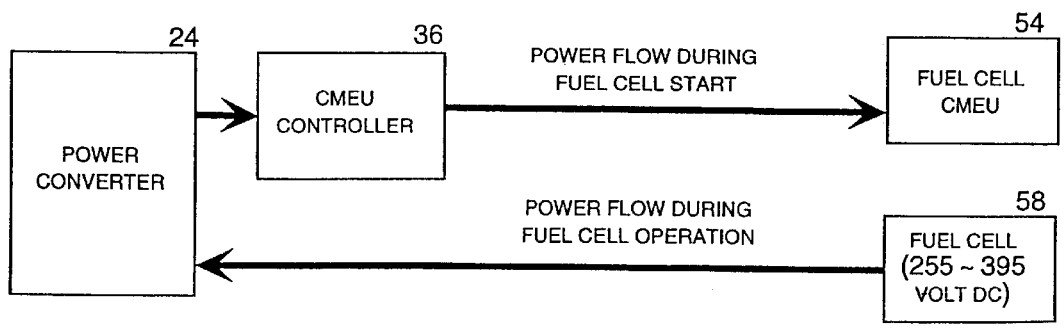
FIG. 2B is a functional block of power flow between a power converter and an electric motor and fuel cell in the fuel-cell powered vehicle of FIG. 2A.

FIG. 2B is a functional block of the bidirectional power flow between the power converter 24, the compressor 54, and the fuel cell 58 in the fuel-cell powered vehicle 50. The power converter 24 delivers power from the battery 60 to the compressor 54 to start the fuel cell 58. Once the fuel cell 58 is running, the power converter 24 delivers power from the fuel cell 58 to the battery 60 to recharge the battery.

Figure 3A:
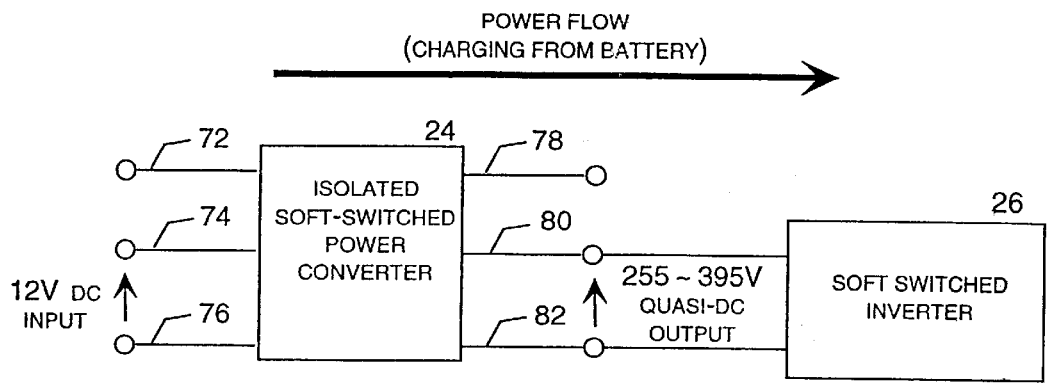
FIG. 3A is a functional block diagram of a soft switching configuration for a power converter.

FIG. 3A is a functional block diagram of a soft-switching configuration for the power converter 24. The low-voltage (primary) side of the power converter 24 includes a primary top-rail terminal 72, a primary center-rail terminal 74, and a primary bottom-rail terminal 76. In addition, the high-voltage (secondary) side of the power converter 24 includes a secondary top-rail terminal 78, a secondary center-rail terminal 80, and a secondary bottom-rail terminal 82.

For power flow from primary to secondary, a low-voltage DC power source, such as a battery or PV panel, is connected across the primary center-rail terminal 74 and the primary bottom-rail terminal 76. For example, the DC power source may be the 12 Volt DC or 36 Volt DC automotive batteries 20 and 60 shown in FIG. 1A and FIG. 1B, respectively. The switching devices of the primary tank circuit are then gated while the switching devices of the secondary remain open, which produces a quasi-DC voltage output across the secondary center-rail terminal 80 and the secondary bottom-rail terminal 82. The gating sequence is described with reference to FIG. 7 and FIG. 13.

The voltage output at the secondary is described as "quasi-DC" because it periodically fluctuates between a positive DC voltage and zero, and the zero-voltage periods remain constant for extended periods sufficient to allow the soft-switching within a subsequent device driven by the power converter 24, such as the power controller 26 shown in FIGS. 1A and 1B. For example, the voltage across the secondary center and bottom rails may produce a quasi-DC voltage in the range of 255 to 395 Volts DC for operating from the fuel cell 58. Typically in this mode of operation, the power converter 26 acts as an inverter to produce a 3-phase AC voltage, for example to drive the electric traction motor 28.

Figure 3B:
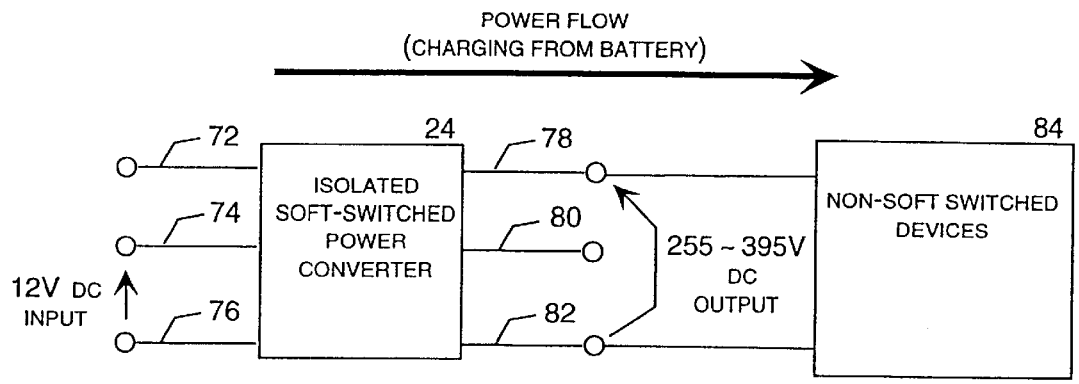
FIG. 3B is a functional block diagram of a non-soft-switching configuration for a power converter.

FIG. 3B is a functional block diagram of a non-soft-switching configuration for the power converter 24. When power flow is from the primary to the secondary, the power converter 24 also produces a relatively constant DC voltage output across the secondary top-rail terminal 78 and the secondary bottom-rail terminal 82. This voltage output may be used to drive non-soft-switched devices 84, such as a DC motor, a "hard switched" inverter, and a DC power distribution system for lights and a wide variety of other DC devices.

Figure 3C:
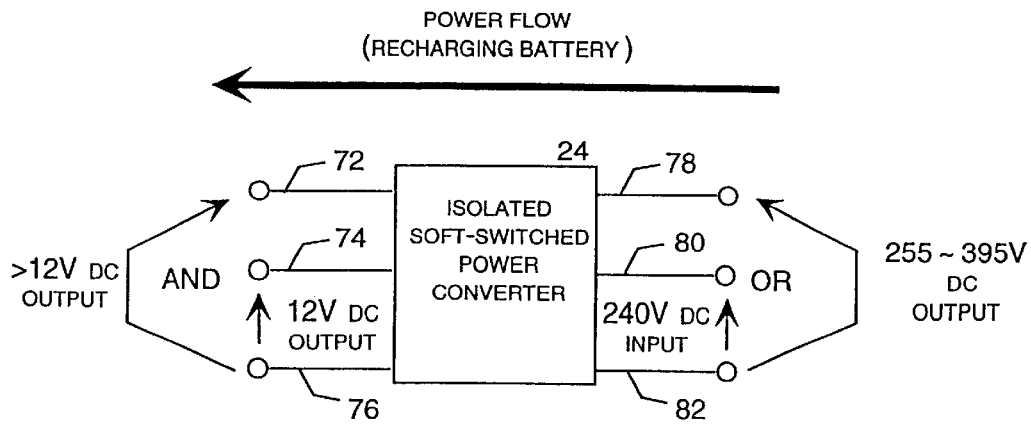
FIG. 3C is a functional block diagram illustrating bidirectional power flow for the configurations of FIGS. 3A and 3B.

FIG. 3C is a functional block diagram illustrating bidirectional power flow for the configurations shown in FIGS. 3A and 3B. The power converter 24 is symmetrical (i.e., primary and secondary tank circuits have a similar circuit configuration) except that the primary side includes a series inductor in the center rail. Thus, to flow power from the secondary to the primary, a power supply is connected to the secondary. For example, 240 Volts DC generated by the motor 28 during deceleration may be connected across the secondary center rail 80 and the secondary bottom rail 82. Alternatively, the 255 to 395 Volt DC output from the fuel cell 58 may be connected across the secondary top rail 78 and the secondary bottom rail 82.

To operate the power converter 24 for power flow from the secondary to the primary, the switching devices of the secondary are gated while the switching devices of the primary remain open. This produces a quasi-DC voltage within the primary tank circuit, which the series inductor smoothes to produce a relatively constant DC voltage across the primary center rail 74 and the primary bottom rail 76. For example, this voltage may be about 12 Volts DC for recharging the battery 20. In addition, a larger and relatively constant DC voltage, such as 16 Volts DC, is obtained across the primary top rail 72 and the primary bottom rail 76.

Figure 4:
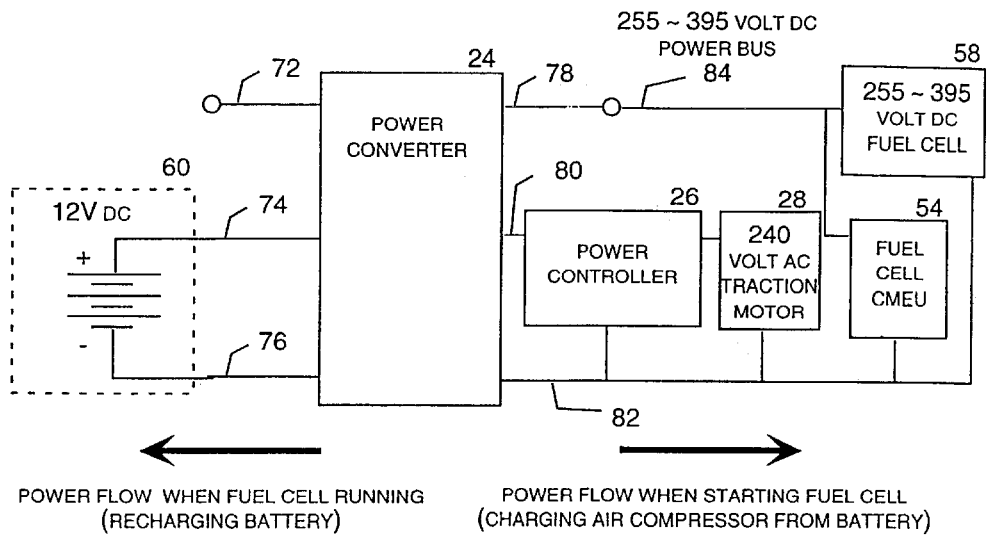
FIG. 4 is a block diagram of the power plant of a typical fuel-cell powered vehicle.

FIG. 4 is a block diagram of the power plant 52 of the fuel-cell powered vehicle 50. To operate the power converter bidirectionally, the automotive battery 60 is connected across the primary center rail 74 and the primary bottom rail 76. On the secondary side, the power controller 26 and the electric traction motor 28 are connected across the secondary center rail 80 and the secondary bottom rail 82 for soft switching, whereas the non-soft-switched compressor 54 and fuel cell 58 are connected across the secondary top rail 78 and the secondary bottom rail 82.

This secondary connection provides a quasi-DC voltage for soft switching in the power controller 26 and the electric traction motor 28, while providing a constant and somewhat higher voltage to the compressor 54 and fuel cell 58. In this configuration, the switching elements of the primary may be gated to start the fuel cell 58 from the battery 60, and once the fuel cell is running, the switching elements of the secondary may be gated to recharge the battery either from the fuel cell 58, or from the motor 28 during deceleration.

Figure 5:
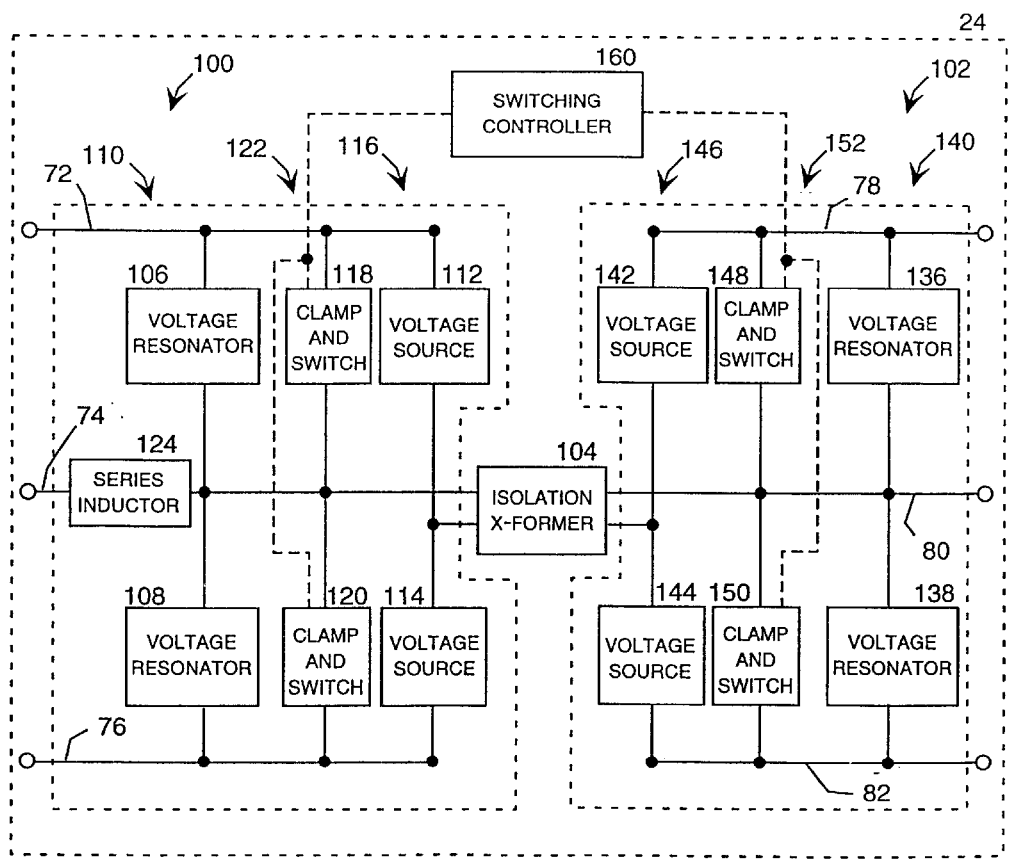
FIG. 5 is a block diagram of an isolated and soft switched power converter.

FIG. 5 is a block diagram of the isolated and soft switched power converter 24. The circuit configuration of the power converter 24 includes a primary resonant tank circuit 100 and a secondary resonant tank circuit 102 coupled back-to-back through an isolation transformer 104. The primary resonant tank circuit 100 includes a pair of resonant capacitances 106, 108 present in series as a resonant leg 110, a pair of voltage sources, such as tank capacitors 112, 114, connected in series as a tank leg 116, and a pair of voltage clamping and switching devices 118, 120 coupled in series as resonant switches and voltage clamping devices for the resonant leg 110. The primary resonant tank circuit 100 also includes a series inductor 124 in the center rail to smooth the voltage output during power flow from the secondary to the primary.

The secondary resonant tank circuit 102 includes a pair of resonant capacitances 136, 138 present in series as a resonant leg 140, a pair of voltage sources, such as tank capacitors 142, 144, connected in series as a tank leg 146, and a pair of equivalent switching devices 148, 150 coupled in series as resonant switches and voltage clamping devices for the resonant leg 140.

The power converter 24 also includes a switching controller 160 for gating the switching elements 118, 120, 148, and 150. The switching controller 160 may be a circuit to generate a proper gating sequence to achieve soft-switching and output power (or voltage) control. The gating sequence is described below with reference to FIG. 7 and FIG. 13.

Those skilled in the art will appreciate that the individual functional blocks of FIG. 5 may be embodied in any type of suitable component that serves the described function. For example, the voltage sources 112, 114, 142, and 144 may be any type of device that maintains a relatively constant DC voltage, such as a tank capacitor, battery, a PV panel, or any other type of DC voltage source. Similarly, the switching and voltage clamping elements 118, 120, 148, and 150 may be transistors such as MOSFETs or IGBTs, thyristors, mechanical switches, or another type of switching device with an anti-parallel clamping diode or other type of voltage clamping device. Many suitable computing stations and circuits may serve as the switching controller 160, including personal computers, workstations, minicomputers, application-specific digital/analog integrated circuits, and so forth.

The resonant capacitances 106, 108, 136, 138 are said to be "present" in the circuit to indicate that they may be a discrete component connected as shown, or they may be an inherent capacitance, such as the stray capacitance associated with switching and voltage clamping devices connected in a similar configuration. That is, the resonant capacitances 106, 108, 136, 138 may be discrete capacitors, stray capacitances inherently present in the circuit, or any other suitable capacitance.

In addition, to simplify the design of the isolation transformer 104, the power converter 24 may include one or more additional inductors in series and/or parallel with the isolation transformer 104 to function as resonating inductors. As shown in FIG. 5, the windings of the isolation transformer 104 may serve as the resonant inductance, which may complicate the design of the transformer.

Figure 6:
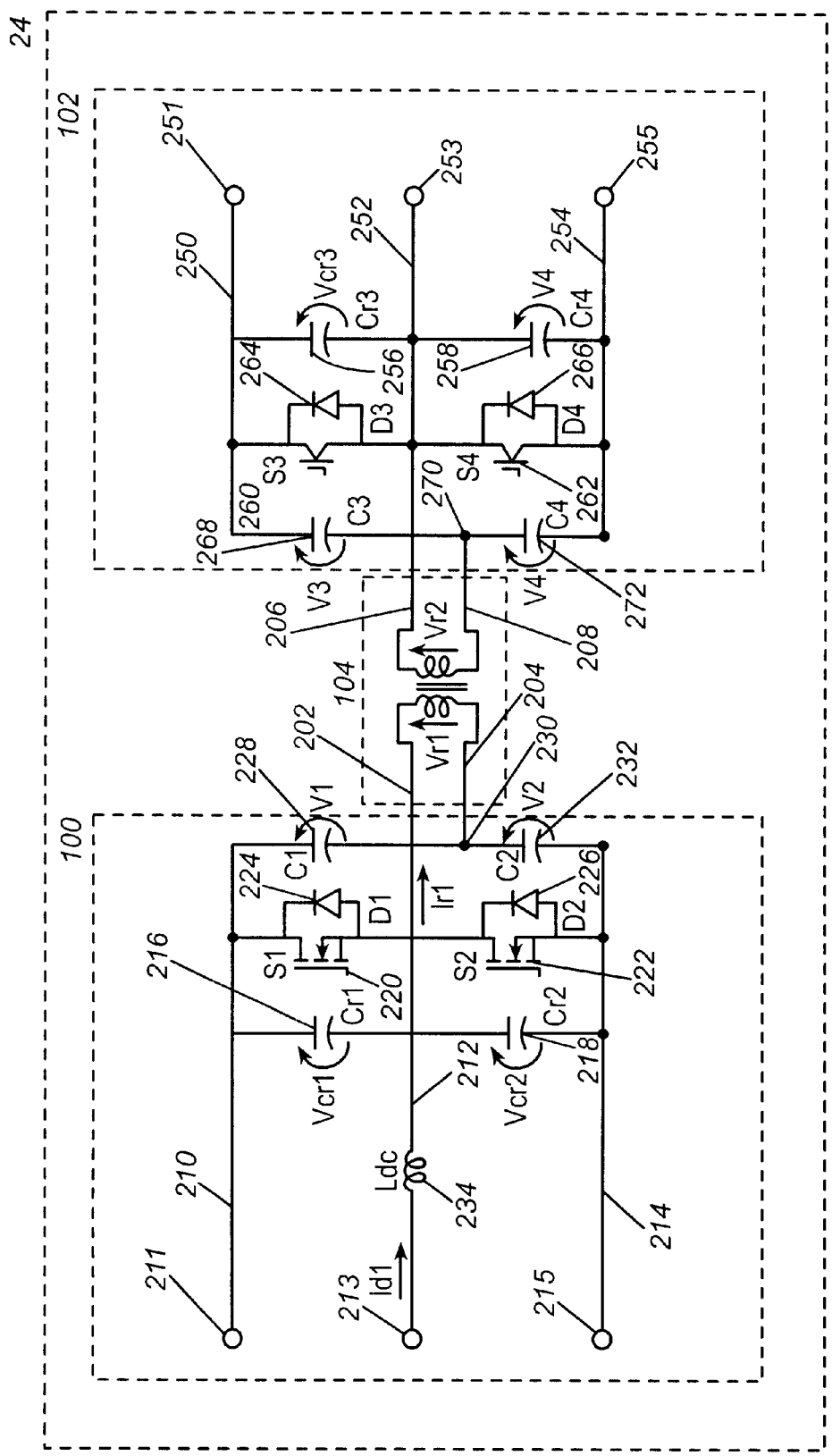
FIG. 6 is a schematic diagram of an illustrative embodiment of an isolated and soft switched power converter.

FIG. 6 is a schematic diagram of an illustrative embodiment of the isolated and soft switched power converter 24, which is suitable for the automotive and electric generation applications described elsewhere in this specification. As in the general case shown in FIG. 5, the specific embodiment shown in FIG. 6 includes a primary resonant tank circuit 100 and a secondary resonant tank circuit 102 coupled back-to-back through an isolation transformer 104. This transformer includes a primary input node 202, a primary output node 204, a secondary input node 206, and a secondary output node 208.

The primary resonant tank circuit 100 includes a primary top rail 210 terminating in a primary top-rail terminal 211, a primary center rail 212 terminating in a primary center-rail terminal 213, and a primary bottom rail 214 terminating in a primary bottom-rail terminal 215. A first primary resonant capacitance 216 (Cr1) is present between the primary top rail 210 and the primary center rail 212. Similarly, a second primary resonant capacitance 218 (Cr2) is present between the primary center rail 212 and the primary bottom rail 214.

A first primary resonant switch 220 (S1, in this case a MOSFET) is connected between the primary top rail 210 and the primary center rail 212. A second primary resonant switch 222 (S2, in this case a MOSFET) is connected between the primary center rail 212 and the primary bottom rail 214. A first primary clamping diode 224 (D1) is connected between the primary top rail 210 and the primary center rail 212. A second primary clamping diode 226 (D2) is connected between the primary center rail 212 and the primary bottom rail 214.

A first primary tank capacitor 228 (C1) is connected between the primary top rail 210 and a primary tap node 230. A second primary tank capacitor 232 (C2) is connected between the primary tap node 230 and the primary bottom rail 214. In addition, the primary center rail 212 is connected to the primary input node 202 of the isolation transformer 104, and the primary tap node 230 is connected to the primary output node 204 of the isolation transformer. The primary resonant tank circuit also includes a series inductor 234 in the center rail 212.

The secondary resonant tank circuit 102 includes a secondary top rail 250 terminating in a secondary top-rail terminal 251, a secondary center rail 252 terminating in a secondary center-rail terminal 253, and a secondary bottom rail 254 terminating in a secondary bottom-rail terminal 255. A first secondary resonant capacitance 256 (Cr3) is present between the secondary top rail 250 and the secondary center rail 252. A second secondary resonant capacitance 258 (Cr4) is present between the secondary center rail 252 and the secondary bottom rail 254.

A first secondary resonant switch 260 (S3, in this case an IGBT) is connected between the secondary top rail 250 and the secondary center rail 252. A second secondary resonant switch 262 (S4, in this case an IGBT) is connected between the secondary center rail 252 and the secondary bottom rail 254. A first secondary clamping diode 264 (D3) is connected between the secondary top rail 250 and the secondary center rail 252. A second secondary clamping diode 266 (D4) is connected between the secondary center rail 252 and the secondary bottom rail 254.

A first secondary tank capacitor 268 (C3) is connected between the secondary top rail 250 and a secondary tap node 270. A second secondary tank capacitor 272 (C4) is connected between the secondary tap node 270 and the secondary bottom rail 254. In addition, the secondary center rail 252 is connected to the secondary input node 206 of the isolation transformer 104, and the secondary tap node 270 is connected to the secondary output node 208 of the isolation transformer.

The power converter 24 utilizes full DC voltage just like the traditional full bridge DC/DC converters, even though it is configured like a half bridge converter on each side of the transformer 104. The power converter 24 includes two resonant tank circuits 100 (RT1) and 102 (RT2) coupled together through the isolation transformer 104 (Tr). Each resonant tank circuit consists of a pair of resonant capacitors (Cr1 and Cr2/Cr3 and Cr4) connected in series as a resonant leg, a pair of tank capacitors (C1 and C2/C3 and C4) connected in series as a tank leg, and a pair (or a device or configuration equivalent to a pair) of switching devices (S1-D1 and S2-D2/S3-D3 and S4-D4) connected in series as resonant switches and clamping devices for the resonant leg.

Figure 13:
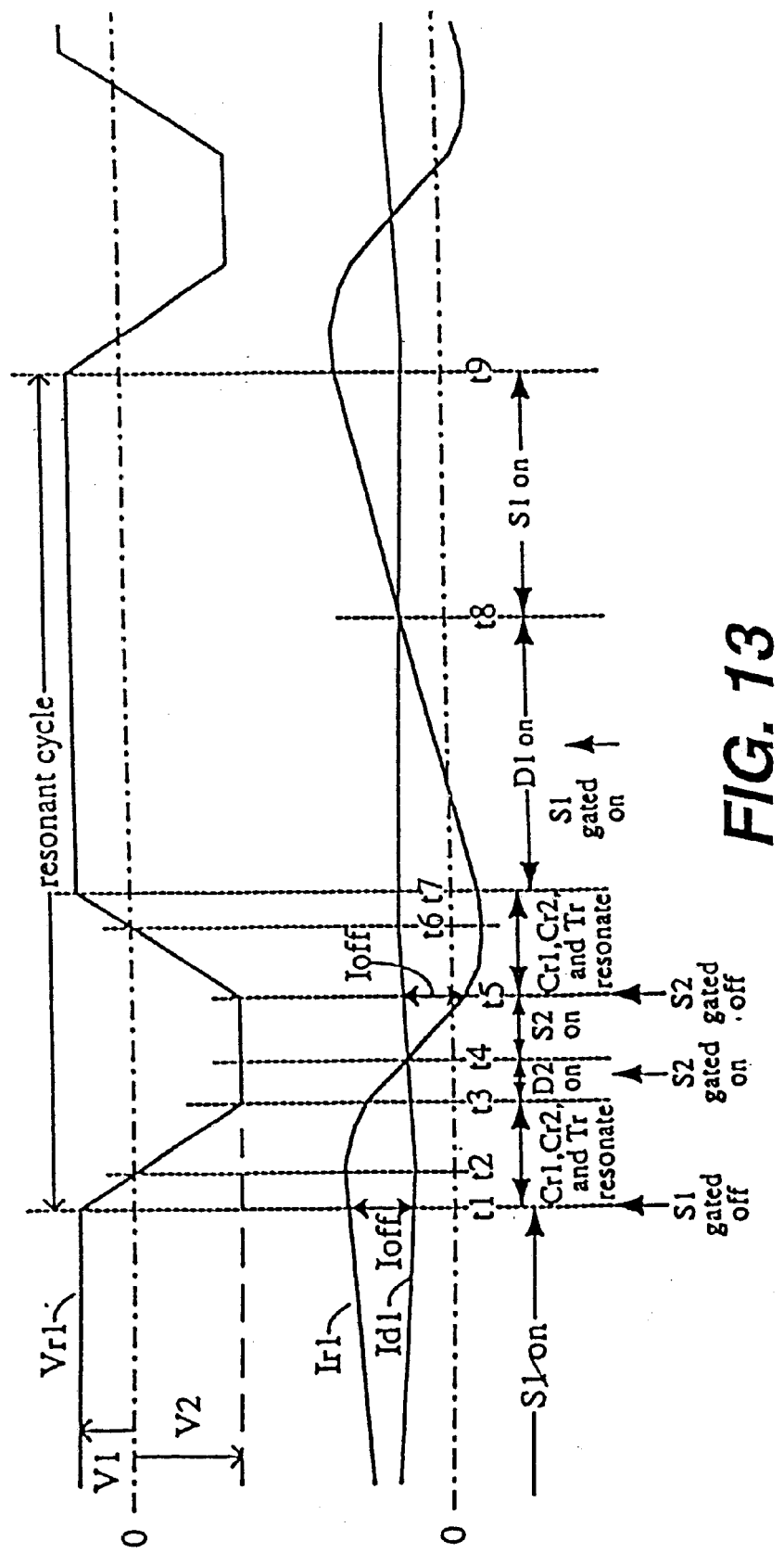
FIG. 13 is a combined timing, voltage and current diagram illustrating the operation of the power converter of FIG. 6.

The two resonant tank circuits, RT1 and RT2, are disposed on the primary side and secondary side of the isolation transformer Tr, respectively. For instance, the resonant tank circuit RT1 generates a quasi-resonant voltage Vr1 across the primary of the transformer Tr. The switches S1 and S2 are zero-voltage turn-off and zero-current zero-voltage turn-on. FIG. 13 shows waveforms and control sequence of the resonant tank circuit RT1. The operating principle is very similar to "Auxiliary Resonant DC Tank Inverter" described in a commonly owned patent application filed on Oct. 28, 1997, U.S. patent application Ser. No. 08/959,200, which is incorporated herein by reference.

For typical electric vehicle and load-side electric generation applications, the power rating of the power converter 24 is in the range of 1 to 100 kW, and the resonant frequency of the power converter is in the range of 10 to 100 kHz. For an illustration, a 20 kHz resonant frequency and 2 kW power rating, electrical component values in the following ranges are typically appropriate, depending on specific design objectives and considerations:

Ldc=3–300 micro-Henries
Cr1=1–100 micro-Farads
Cr2=1–100 micro-Farads
C1=2–200 milli-Farads
C2=2–200 milli-Farads
Cr3=0.01–1 micro-Farads
Cr4=0.01–1 micro-Farads
C3=3–300 micro-Farads
C4=3–300 micro-Farads Those skilled in the art will understand how to select specific element value for specific applications, such as electric vehicles, hybrid vehicles, fuel-cell powered vehicles, and electric generation systems.

Figure 7:
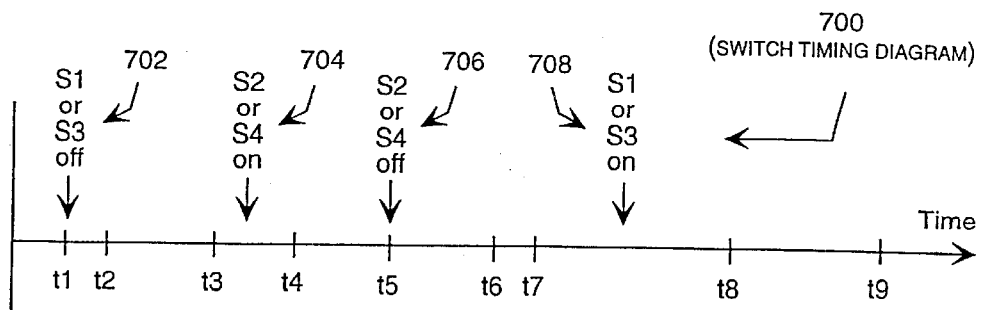
FIG. 7 is a timing diagram illustrating a gating sequence for the power converter of FIG. 6.

FIG. 7 is a timing diagram illustrating the gating sequence for the power converter 24 for one resonant cycle. This gating sequence repeats at the resonant frequency or switching frequency of the converter, typically in the range of 10 to 100 kHz for automotive and electric power applications. However, other resonant frequencies may be appropriate for other applications. For simplicity of explanation, the circuit will be described with S1 and S2 gated, with S3 and S4 held open, which produces power flow from the primary to the secondary. Specifically, S1 is gated off at time t1, S2 is gated on between times t3 and t4, S2 is gated off at time t5, and S1 is gated on between times t7 and t8. It will be appreciated that the same gating sequence may be used for S3 and S4, with S1 and S2 held open, to transmit power from the secondary to the primary.

Figure 8:
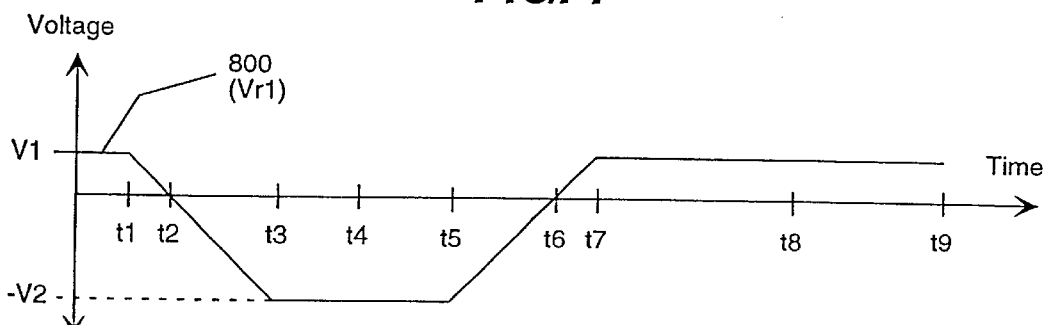
FIG. 8 is an electric voltage diagram illustrating the voltage on the primary side of the isolation transformer of the power converter of FIG. 6.

FIG. 8 is an electric voltage diagram illustrating a voltage (Vr1) waveform 800 on the primary side of the isolation transformer 104 of the power converter 24 in response to the gating sequence shown in FIG. 7. The location of Vr1 in the power converter circuit is shown on FIG. 6. The voltage Vr1 starts prior to time t1 at a maximum steady-state value equal to the voltage V1 across the first primary tank capacitor C1. Starting at time t1, when S1 is gated off, the voltage Vr1 drops until it reaches −V2, negative of the voltage across the second primary tank capacitor C2, at time t3. The voltage Vr1 then remains at the steady state value −V2 until time t5, when S2 is gated off. Thus, S2 is gated on while Vr1 is at a steady-state value of −V2. Starting at time t5, when S2 is gated off, the voltage Vr1 rises until it reaches V1, the voltage across the first primary tank capacitor C1, at time t7. The voltage Vr1 then remains at a steady state value of V1 until the end of the cycle. Thus, S1 is gated on while Vr1 is at a steady-state value of V1. The voltage Vr2 on the secondary side of the isolation transformer 104 has the same shape, except that it is boosted by the transformer turns ration "n" and may have a phase shift.

Figure 9:
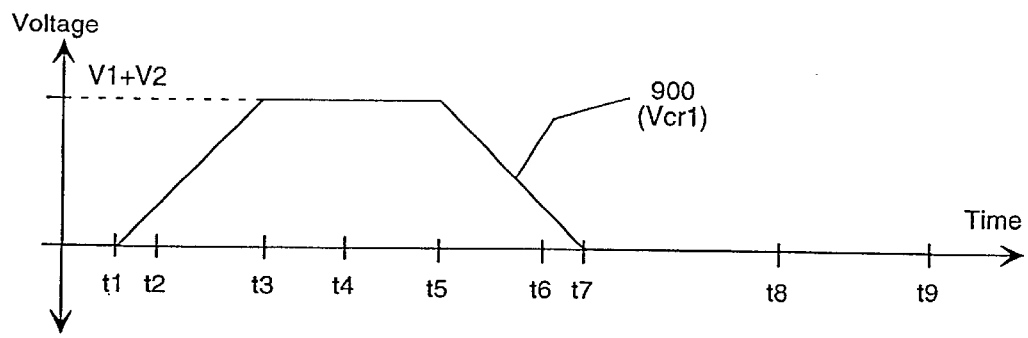
FIG. 9 is an electric voltage diagram illustrating the voltage on a first primary resonant capacitor of the power converter of FIG. 6.

FIG. 9 is an electric voltage diagram illustrating a voltage (Vcr1) waveform 900 across the first primary resonant capacitor 216 (Cr1) in response to the gating sequence shown in FIG. 7. The location of Vcr1 in the power converter circuit is shown on FIG. 6. The voltage Vcr1 starts prior to time t1 at a zero steady-state value. Starting at time t1, when S1 is gated off, the voltage Vcr1 rises until it reaches V1+V2, the sum of the voltages across the first and second primary tank capacitors 228 (C1) and 232 (C2), at time t3. The voltage Vcr1 then remains at the state value V1+V2 until time t5, when S2 is gated off. Thus, S2 is gated on while Vcr1 is at a steady-state value of V1+V2. Starting a time t5, when S2 is gated off, the voltage Vcr1 drops until it reaches zero at time t7. The voltage Vrc1 then remains at a steady state value of zero until the end of the cycle. Thus, S1 is gated on while Vcr1 is at a steady-state value of zero.

Figure 10:
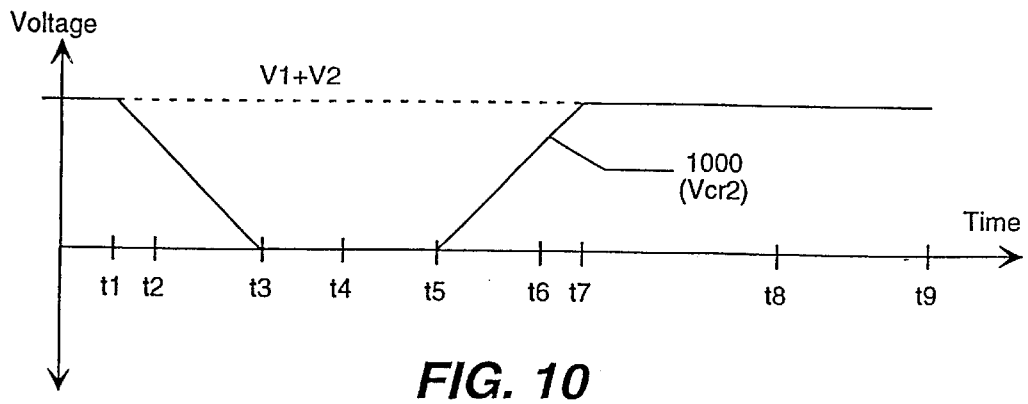
FIG. 10 is an electric voltage diagram illustrating the voltage on a second primary resonant capacitor of the power converter of FIG. 6.

FIG. 10 is an electric voltage diagram illustrating a voltage (Vcr2) waveform 1000 across the second primary resonant capacitor Cr2 in response to the gating sequence shown in FIG. 7. The location of Vcr2 in the power converter circuit is shown on FIG. 6. The voltage Vcr1 is the inverse of Vcr2 because Cr1 and Cr2 resonate and Vcr1+Vcr2 equals the sum of the tank capacitor voltages V1+V2. That is, Vcr2 starts prior to time t1 at a steady-state rate value equal to V1+V2, the sum of the voltages across the first and second primary tank capacitors 228 (C1) and 232 (C2). Starting at time t1, when S1 is gated off, the voltage Vcr2 drops until it reaches zero at time t3. The voltage Vcr2 then remains at the steady state zero value until time t5, when S2 is gated off. Thus, S2 is gated on while Vcr2 is at a steady-state value of zero. Starting at time t5, when S2 is gated off, the voltage Vcr2 rises until it reaches V1+V2 at time t7. The voltage Vrc2 then remains at a steady state value of V1+V2 until the end of the cycle. Thus, S1 is gated on while Vcr2 is at a steady-state value of V1+V2.

Figure 11:
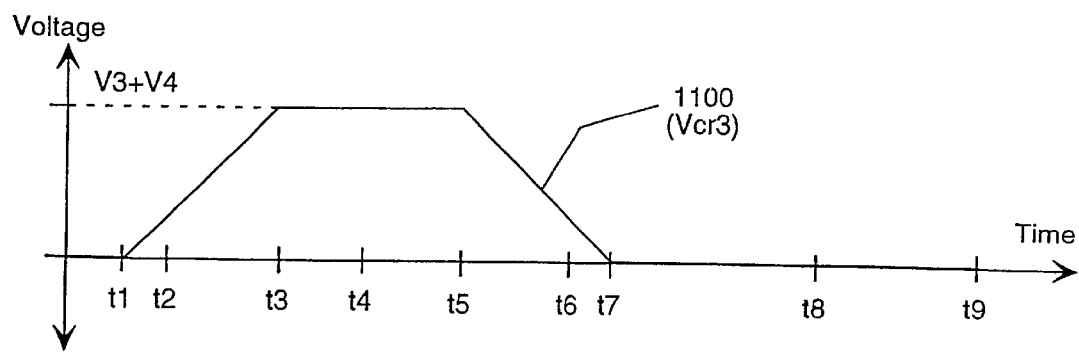
FIG. 11 is an electric voltage diagram illustrating the voltage on a first secondary resonant capacitor of the power converter of FIG. 6.

FIG. 11 is an electric voltage diagram illustrating a voltage (Vcr3) waveform 1100 across the first secondary resonant capacitor 256 (Cr3) of the power converter 24. The voltage Vcr3 has a similar shape as the voltage Vcr1 shown in FIG. 9, except that it is rises until it reaches V3+V4, the sum of the voltages across the first and second secondary tank capacitors 268 (C3) and 272 (C4), at time t3.

Figure 12:
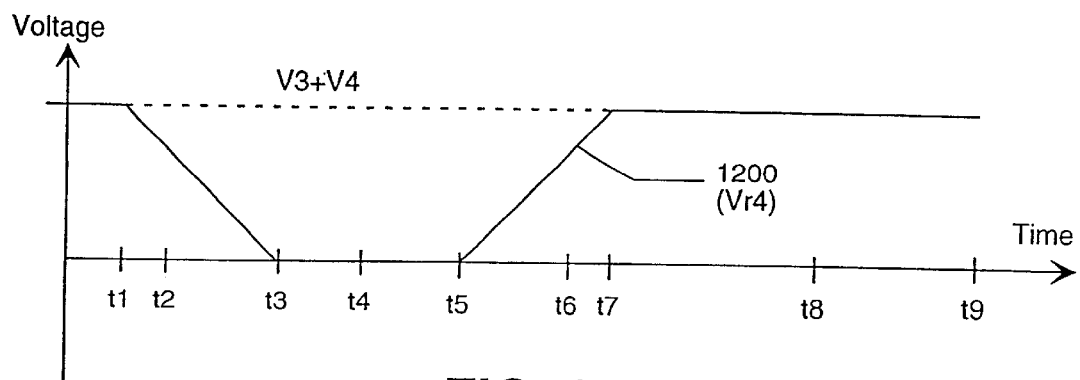
FIG. 12 is an electric voltage diagram illustrating the voltage on a second secondary resonant capacitor of the power converter of FIG. 6.

FIG. 12 is an electric voltage diagram illustrating a voltage (Vcr4) waveform 1200 on the second secondary resonant capacitor 258 (Cr4) of the power converter 24. This voltage is also referred to as the output voltage Vrb because a soft switched inverter can be connected across the secondary resonant capacitor 258 (Cr4). The voltage Vcr4 has a similar shape as the voltage Vcr2 shown in FIG. 10, except that it is rises until it reaches V3+V4, the sum of the voltages across the first and second secondary tank capacitors 268 (C3) and 272 (C4), at time t7. The repeatedly obtained steady-state zero-voltage period from t3 until t5 allows an inverter connected across the center and bottom rails of the secondary tank circuit to soft switch.

FIG. 13 is a combined timing, voltage and current diagram illustrating the operation of the power converter 24. The gating sequence is also shown to illustrate how to generate the quasi-resonant output voltage Vr1 on the primary side of the isolation transformer 104 (Tr). FIGS. 14–21, which show the current paths in the power converter 24 at various stages of the resonant cycle, will also be referred to during the following discussion of FIG. 13. The arrows on FIGS. 14–21 indicate the direction of current flow, and the dashed lines around certain capacitors indicate that the capacitor is charged.

Figure 14:
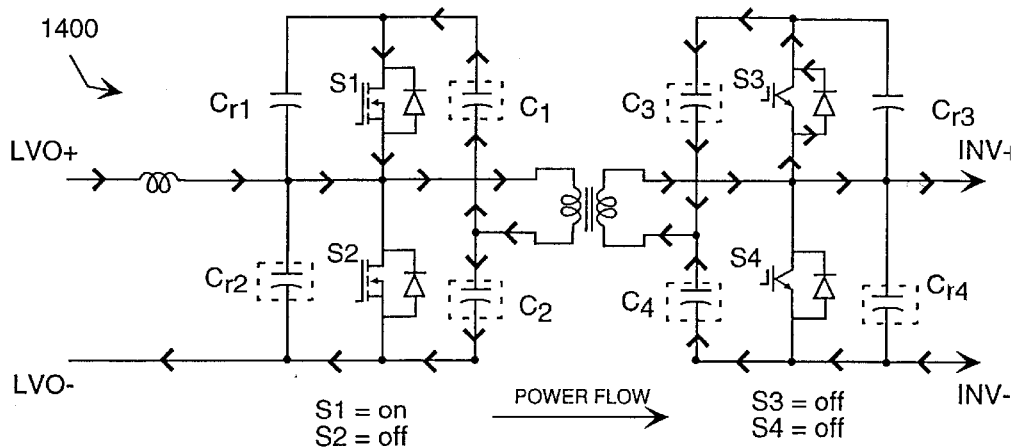
FIG. 14 is a circuit diagram illustrating the current and capacitor charge states in the power converter of FIG. 6 during a first time interval of a resonant cycle.
Figure 15:
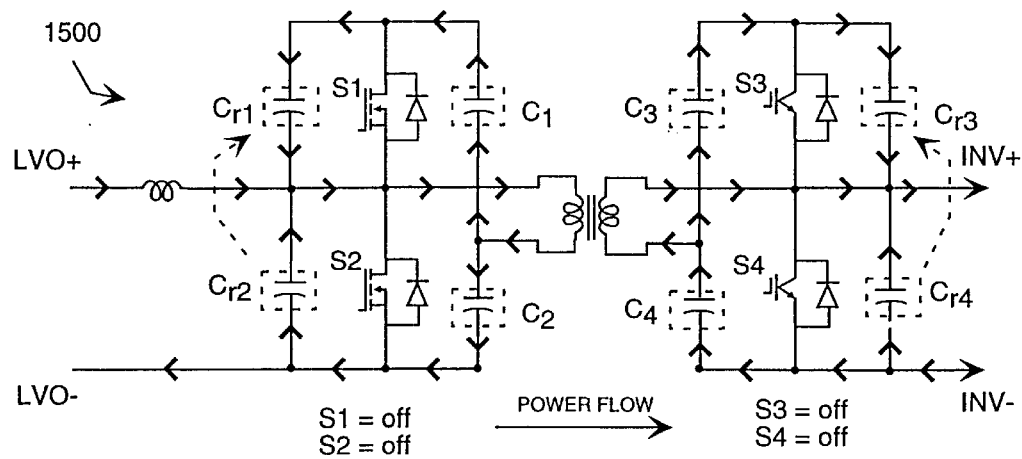
FIG. 15 is a circuit diagram illustrating the current and capacitor charge states in the power converter of FIG. 6 during a second time interval of a resonant cycle.

The time from t1 to t9 it is one resonant cycle. The gating sequence shown in FIG. 13 is the same as that shown in FIG. 7. Before t1, switch S1 is on, and the resonant current Ir1 through the transformer Tr increases (i.e., the energy stored in Tr increases) and Vr1 is clamped to tank capacitor voltage V1. This state is shown in FIG. 14. When the current through switch S1, (Ir1-Id), reaches a preset turn-off value, Ioff, the switching device S1 is gated off at t1. S1 is zero-voltage turn-off because of capacitor Cr1's zero initial voltage. The resonant capacitors Cr1 and Cr2 and the transformer Tr's equivalent inductance (or stored energy) form a resonant circuit. The equivalent resonant current (Ir1-Id1) starts to charge Cr1 and discharge Cr2, that is, voltage Vr1 starts to decrease from t1. This state is shown in FIG. 15.

Figure 16:
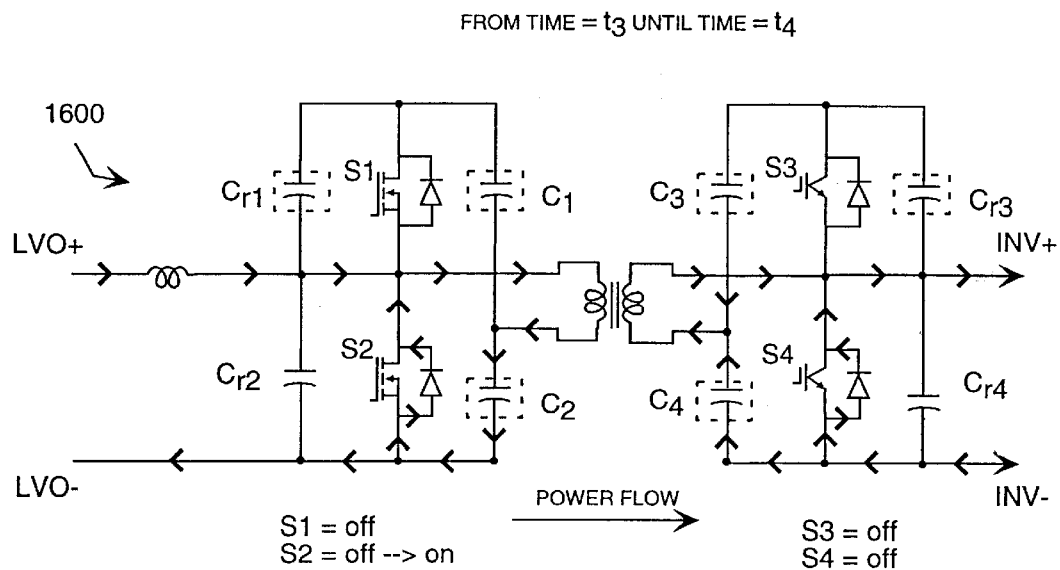
FIG. 16 is a circuit diagram illustrating the current and capacitor charge states in the power converter of FIG. 6 during a third time interval of a resonant cycle.

From t1 to t2 it is a free resonant period of Cr1, Cr2, and Tr. When the resonant capacitor (Cr2)'s voltage Vcr2 reaches zero, i.e., Vr1 reaches (−V2) and the equivalent resonant current (Ir1-Id1) attempts to negatively charge the resonant capacitor Cr2, diode D2 conducts and clamps Vr1 to negative V2 and Vr2 to zero. Here, V2 is the tank capacitor (C2)'s voltage. Current Ir1 starts to decrease at t2 when Vr1 crosses the zero line. During D2's conduction period (t3–t4), switch S2 is gated on, thus accomplishing zero-current and zero-voltage turn-on. This state is shown in FIG. 16.

Figure 17:
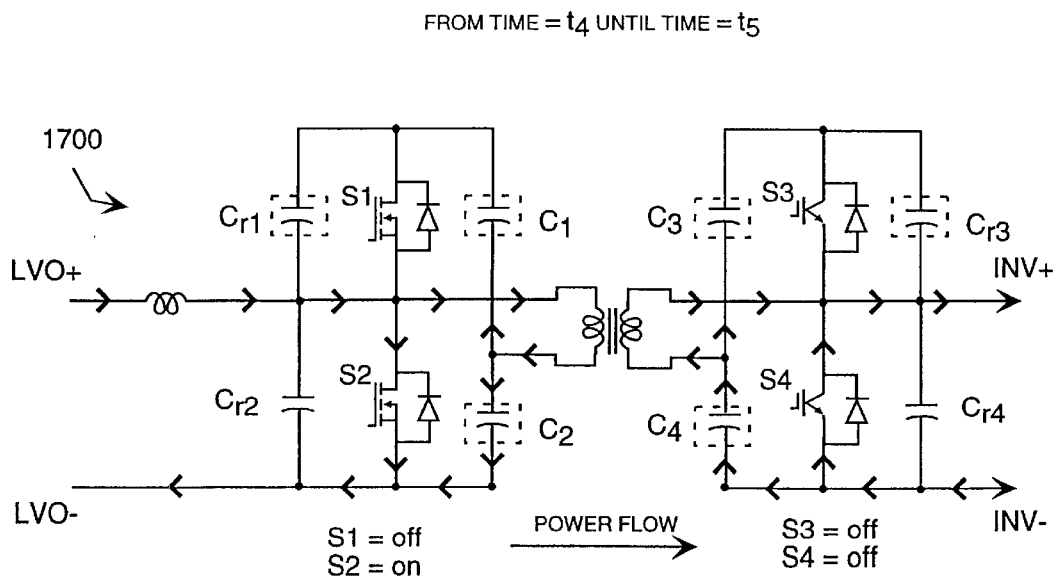
FIG. 17 is a circuit diagram illustrating the current and capacitor charge states in the power converter of FIG. 6 during a fourth time interval of a resonant cycle.
Figure 18:
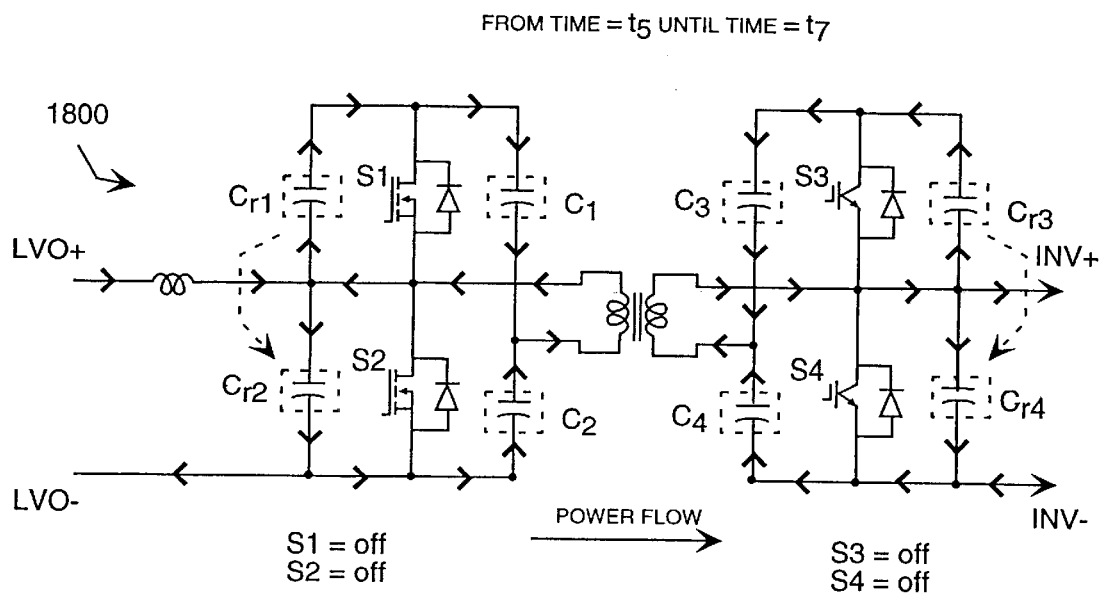
FIG. 18 is a circuit diagram illustrating the current and capacitor charge states in the power converter of FIG. 6 during a fifth time interval of a resonant cycle.

When Ir1 decreases and becomes smaller than Id1, S2 starts to conduct and the current commutates from D2 to S2. This state is shown in FIG. 17. The current Ir1 keeps decreasing and the current through switch S2 (Id1-Ir1) increases. When the S2 current (Id1-Ir1) reaches the preset turn-off value Ioff, S2 is gated off at t5. A resonant circuit then forms with the resonant capacitors Cr1 and Cr2 and the transformer Tr between t5 and t7, similar to the period of t1 to t3. This state is shown in FIG. 18.

Figure 19:
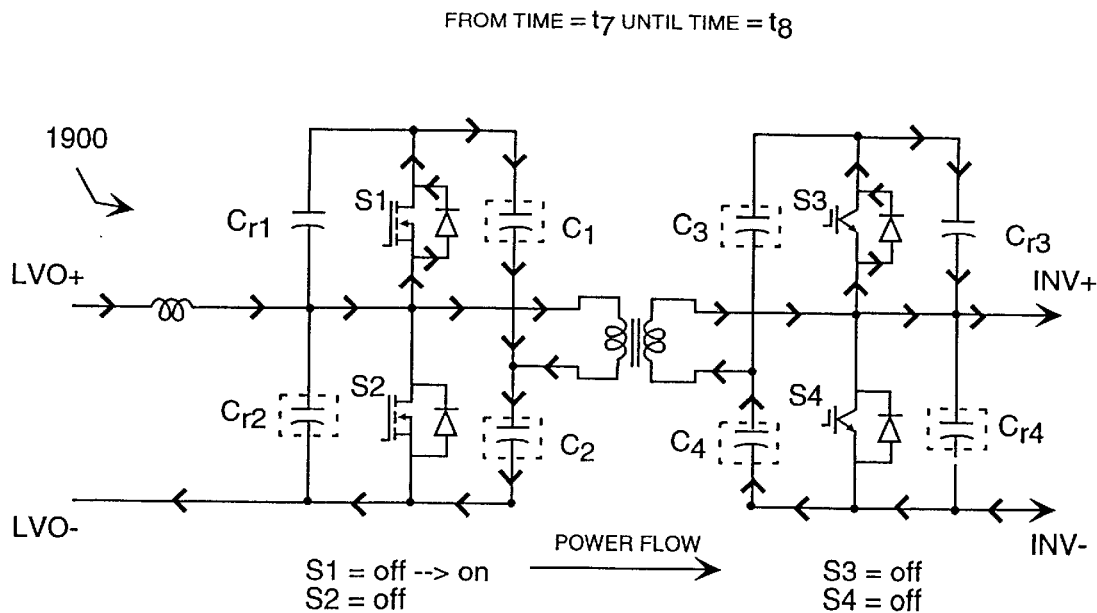
FIG. 19 is a circuit diagram illustrating the current and capacitor charge states in the power converter of FIG. 6 during a sixth time interval of a resonant cycle.

The equivalent resonant current (Id1-Ir1) charges Cr2 and discharges Cr1. The output voltage Vr1 increases. When Vr1 crosses the zero line at t6, the transformer current Ir1 turns around from negative increasing and starts to increase positively. At t7, Vr1 reaches the tank capacitor voltage V1, i.e., Cr1 is discharged to zero and Cr2 is charged to the total tank capacitor voltage (V1+V2). When the equivalent resonant current (Id1-Ir1) attempts to overshoot Cr2's voltage, D1 conducts and clamps Cr2's voltage; that is, Vr1 is clamped to V1 through D1. The diode D1 conducts till Ir1 becomes larger than Id1. This state is shown in FIG. 19. At any time during D1's conduction period (t7–t8), S1 is gated on, thus accomplishing zero-current and zero-voltage turn-on.

Figure 20:
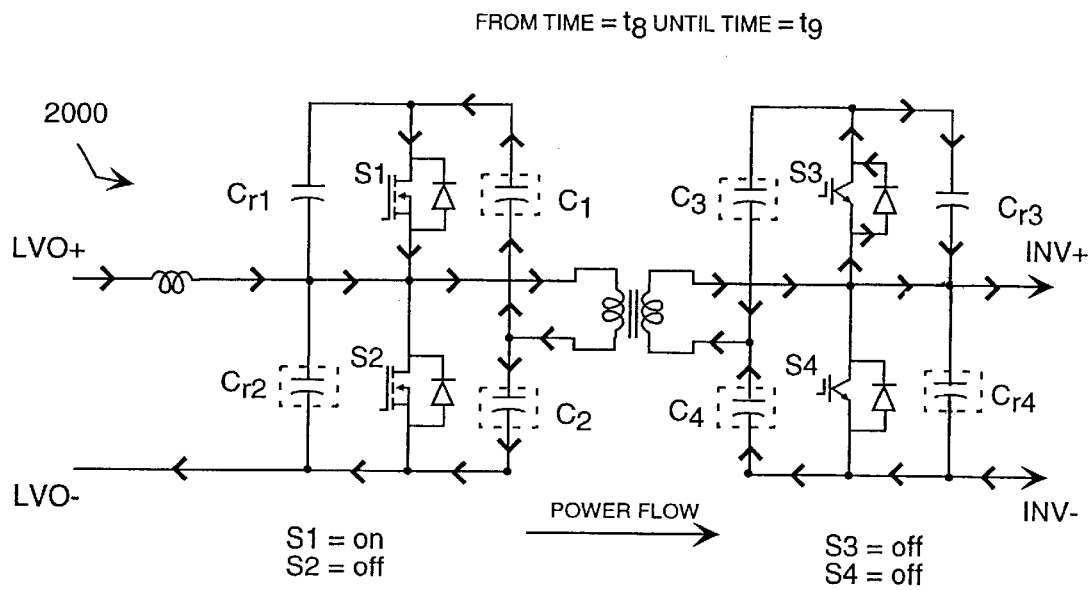
FIG. 20 is a circuit diagram illustrating the current and capacitor charge states in the power converter of FIG. 6 during a seventh time interval of a resonant cycle.
Figure 21:
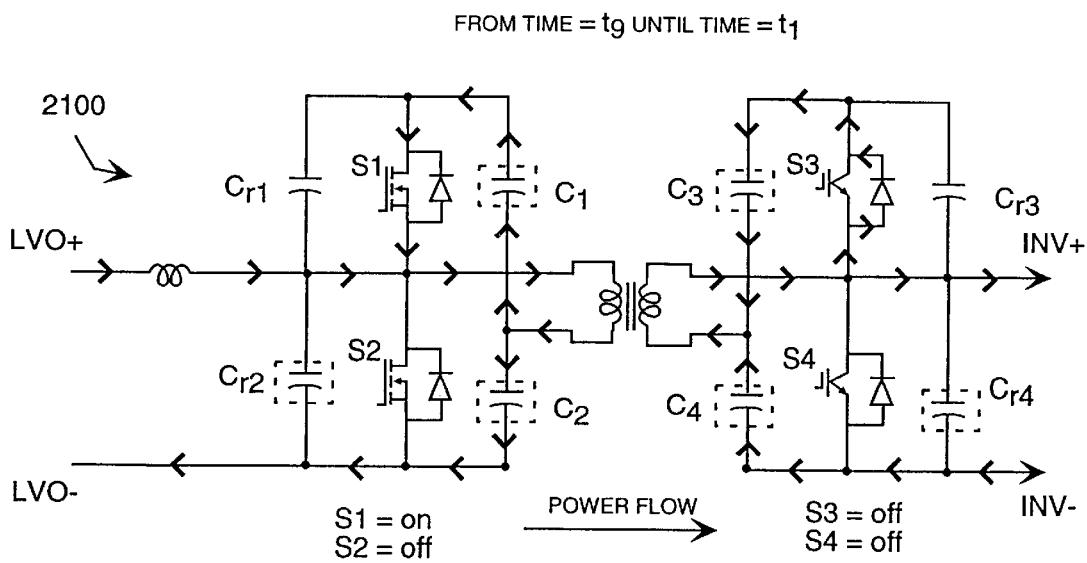
FIG. 21 is a circuit diagram illustrating the current and capacitor charge states in the power converter of FIG. 6 during an eighth time interval of a resonant cycle.

At t8, the current commutates from D1 to S1. This state is shown in FIG. 20. S1 then conducts until the end of the resonant cycle, t9. This state is shown in FIG. 21. A new resonant cycle then repeats from t9. Therefore, both S1 and S2 are zero-voltage turn-off and zero-current zero-voltage turn-on. The change rate (dV/dt) of the output voltage Vr1 and resonant voltage Vcr2 during the resonant periods (t1–t3) and (t5–t7) can be controlled by Cr1, Cr2, equivalent inductance of Tr, and preset turn-off current value Ioff. Vr1 is controlled such that its average over one resonant cycle has to be zero. Therefore, the total voltage, (V1+V2), is determined by the duty cycle of S1, which is defined below. The average value of Vcr2, (Vcr2=Vr1+V2), over one resonant cycle is equal to the input voltage Vin if neglecting the inductor (Ldc)'s resistance. When the power flow is from the low-voltage (primary) side to the high-voltage (secondary) side, the resonant tank circuit RT2 is operated as a rectifier. In FIG. 6, the following relations exist:

$$Vr2 = n \cdot Vr1,$$

$$V3 = n \cdot V1,$$

$$V4 = n \cdot V2,$$

and $$Vrb = n \cdot Vcr2,$$

Where "n" is the turns ratio of the secondary winding over the primary winding of the transformer.

FIG. 10 shows the waveform of the resonant voltage Vcr2 and Vrb since Vcr2 and Vrb have a similar shape with a factor of the turns ratio n. The zero-voltage period of Vrb provides an opportunity for the inverter to soft switch. Therefore, both resonant tank circuits are switched only when the inverter wants to switch for pulse-width modulation (PWM) in the case of DC/DC/AC power conversion.

The switching duty cycle, D, is defined as the equivalent conducting time over one resonant cycle. That is, $$D = \frac{Ts1}{Ts1 + Ts2},$$

where Ts1 and Ts2 are switches S1's on time and S2's on time, respectively, as shown in FIGS. 7 and 13. The duty cycle can be set to any value between 0% to 100% according to applications. For DC-DC conversion, the duty cycle may be set to near 50%, resulting in V1 approximately equal to V2, and V3 approximately equal to V4. For DC-DC-AC conversion, a higher duty cycle is desirable, so that V2 is higher than V1, and V2 is approximately equal to Vin (the voltage across the primary center-rail terminal 213 and the primary bottom-rail terminal 215 shown n FIG. 6). In addition, the resonant tank circuits are used to generate short zero-voltage periods for the inverter to switch. Therefore, the zero-voltage period (from t3 to t5 in FIG. 13) of Vrb should be kept minimum to utilize the DC voltage as much as possible. Then both resonant tank circuits are switched only when the inverter needs to switch for PWM. From FIG. 6, the following relations can be derived:

$$(V1 + V2) = \frac{Vin}{D},$$

$$(V3+V4) = n \cdot (V1+V2),$$

and $$Vrb = n \cdot Vcr2.$$

Obviously, the DC tank capacitor voltages, (V1+V2) and (V3+V4), can be regulated by the duty cycle D to obtain a constant and stable voltage output regardless of ripples or variations from the input voltage Vin. These relations are valid for all the illustrative embodiments and modifications of the invention.

Figure 22:
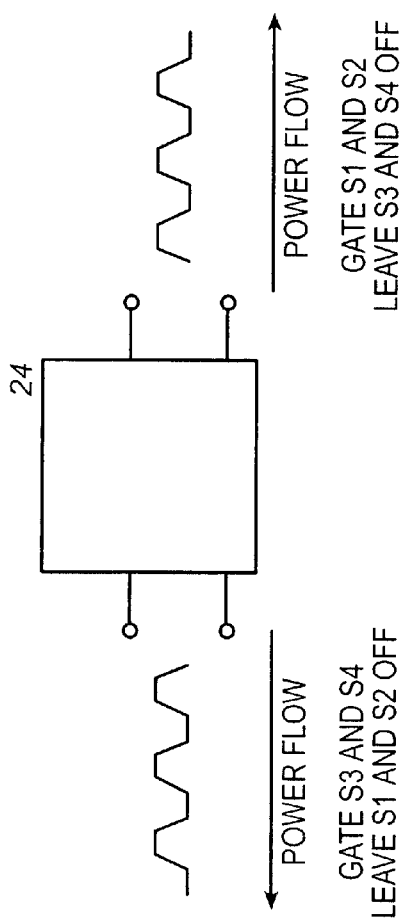
FIG. 22 is a functional block diagram illustrating bidirectional power flow in the power converter of FIG. 6.

FIG. 22 is a functional block diagram illustrating bidirectional power flow in the power converter 24. The secondary resonant tank circuit 102 (RT2) can be controlled as described above for the primary resonant tank circuit 100 (RT1) with reference to FIG. 13. That is, for power flow from the primary to the secondary, S1 and S2 are gated with S3 and S4 held open. The same gating sequence may be used for S3 and S4, with S1 and S2 held open, to transmit power from the secondary to the primary. Referring to FIG. 7, S3 is gated off at time t1, S4 is gated on between times t3 and t4, S4 is gated off at time t5, and S3 is gated on between times t7 and t8. When the power flow is from the high-voltage (secondary) side to the low-voltage (primary) side, the resonant tank circuit 100 (RT1) operates like a rectifier.

Figure 23:
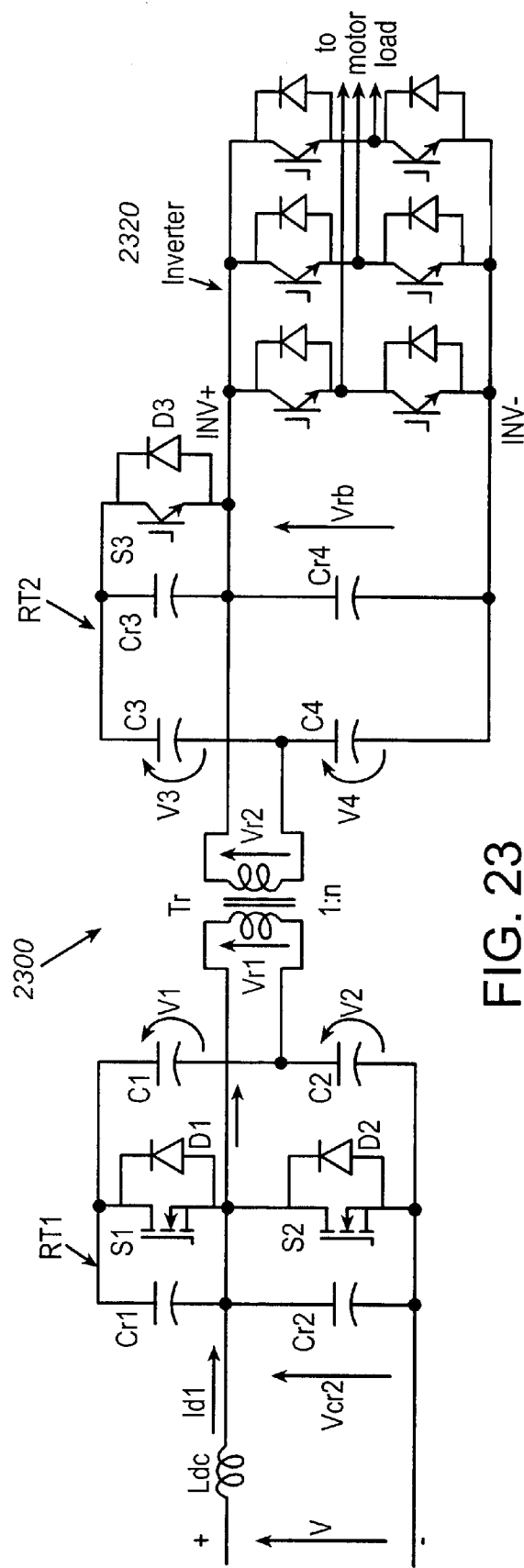
FIG. 23 is a circuit diagram illustrating an alternative power converter in which an inverter connected to the secondary tank circuit replaces one of the switching devices of the secondary tank circuit.

The power converter 24 can be used and modified for many applications, as illustrated by the variations shown in FIGS. 23–30. For example, FIG. 23 is a circuit diagram illustrating an alternative power converter 2300 in which an inverter 2320 connected to the secondary tank circuit replaces the second secondary switching device 262 (S4) and the second secondary clamping diode 266 (D4) of the secondary tank circuit 102 (RT2). For example, the power converter 24 of FIG. 6 can be used as a DC/DC boost or buck converter, in which the input can be connected to the input terminals 213 and 215 and loads can be connected to the output terminals 251 and 255 (HV+ and HV−) to obtain regulated and isolated voltage. At the same time, those loads that do not require isolation can be connected to the terminals 211 and 215 for a regulated voltage without isolation. In some applications, such as electric vehicle applications, where both isolated DC/DC boost and DC/AC power conversion are required, an inverter can be coupled to the terminals 253 and 255 (INV+ and INV−), as shown in FIG. 23. In this case, the second secondary switching device 262 (S4) and the second secondary clamping diode 266 (D4) can be eliminated by using the inverter as an equivalent switch and diode. The modified power converter is shown in FIG. 23, in which a three-phase inverter 2320 is illustrated as an example for DC/AC power conversion.

This embodiment for DC/DC/AC power conversion has several advantages over traditional topologies. Only three switching devices are used for isolated DC/DC power conversion, resonant soft-switching, and bidirectional power flow implementation. All devices are soft-switched including the inverter for DC/AC power conversion, where S1, S2, and S3 are zero-voltage turn-off and zero-current zero-voltage turn-on and the inverter switches are zero-voltage switching. In addition, low current and voltage stresses are implemented because the inverter switches carry only load current without additional superposed current for soft-switching and the DC/DC conversion switches carry the minimum current from the input voltage Vin to the load and sustain minimum voltage, thus achieving high efficiency.

Figure 24:
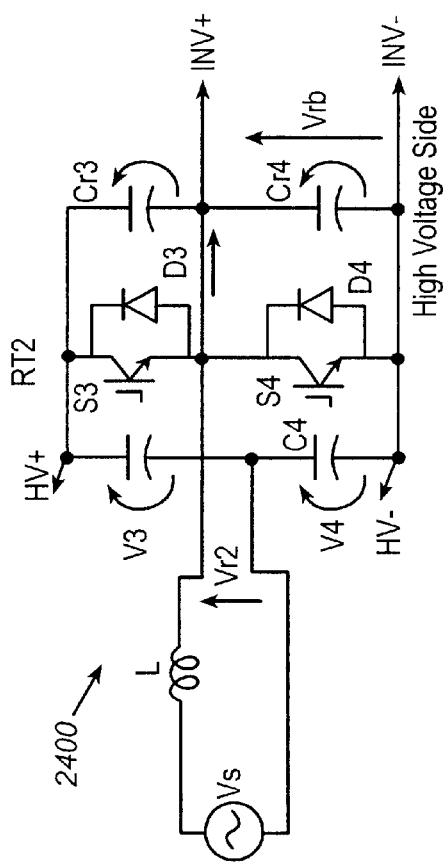
FIG. 24 is a circuit diagram illustrating an equivalent electrical circuit for the primary tank circuit of a power converter.

FIG. 24 is a circuit diagram illustrating an equivalent electrical circuit 2400 for the primary tank circuit 100 of the power converter 24. Those skilled in the art will appreciate that it is possible to regulate the output voltage Vrb by controlling the duty cycle of only one resonant tank circuit, 100 or 102. For example, the high-voltage resonant tank circuit 102 of FIG. 6 may be used to control and regulate the output voltage Vrb, while the low-voltage resonant tank circuit 100 is operated at a 50% duty cycle. In this case, the low-voltage resonant tank circuit 100 generates a quasi-square-wave voltage acting as a voltage source across the primary of the transformer 104. FIG. 24 shows an equivalent circuit of this case, where the low-voltage resonant tank circuit 100 is replaced with an equivalent voltage source Vs and the transformer is replaced with an equivalent inductance L. In this case, the high-voltage resonant tank circuit 102 can be operated in a manner to control its DC voltage, since it is completely equivalent to a conventional half-bridge PWM voltage-source converter connected to an AC source.

Figure 25:
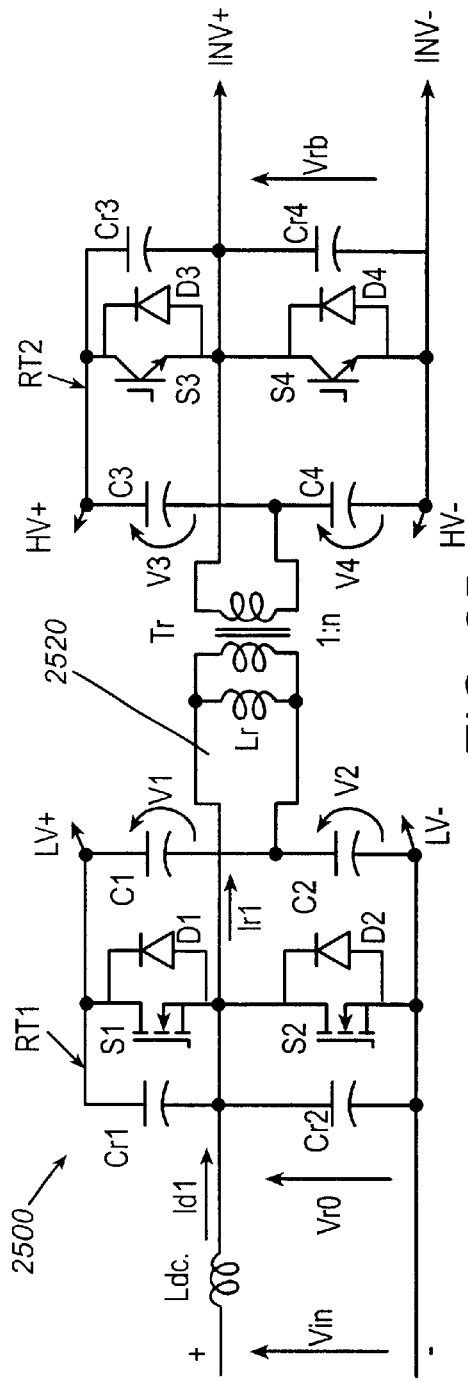
FIG. 25 is a circuit diagram illustrating an alternative power converter including a shunt inductor connected across the primary side of the isolation transformer.
Figure 26:
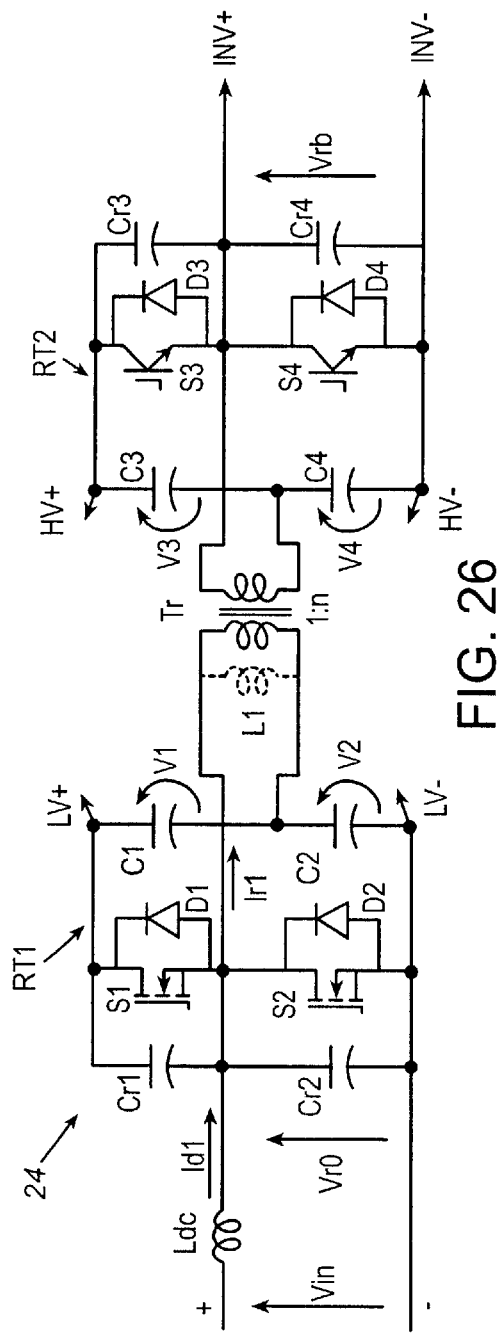
FIG. 26 is a circuit diagram illustrating leakage and self inductance in the isolation transformer of a power converter.

FIG. 25 is a circuit diagram illustrating an alternative power converter 2500 including a shunt inductor 2520 connected across the primary side of the isolation transformer 104 (Lr). In this alternative, the resonant inductor, Lr, is used as the resonating inductance for the resonant tank circuits 100 and 102. This allows the transformer 104 (Tr) to be more simply designed as a traditional isolation transformer without the necessity of consideration of transformer's leakage and self inductance used as the resonating inductance for the resonant tank circuits 100 and 102, as shown in FIG. 26.

Figure 27:
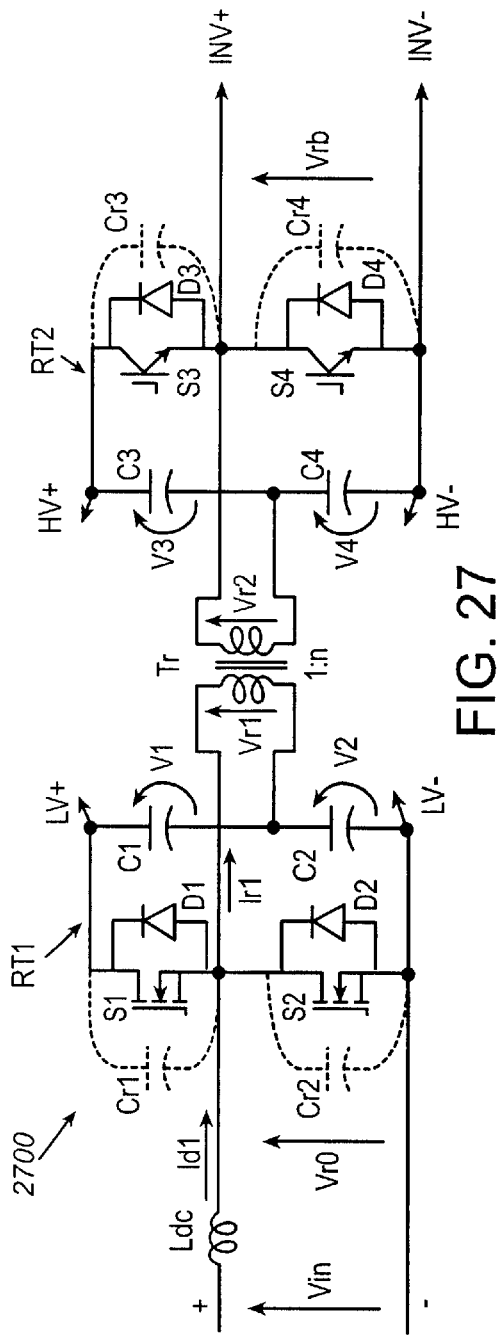
FIG. 27 is a circuit diagram illustrating an alternative power converter in which stray capacitance provides the resonant capacitance.

FIG. 27 is a circuit diagram illustrating an alternative power converter 2700 in which stray capacitance provides the resonant capacitance. That is, the devices (S1/D1), (S2/D2), (S3/D3), and (S4/D4)'s respective stray capacitance provide the resonating capacitances, Cr1, Cr2, Cr3, and Cr4, as shown in dashed lines. In this case, discrete external resonant capacitors can be omitted, although the voltage rise rate would be relatively high.

Figure 28:
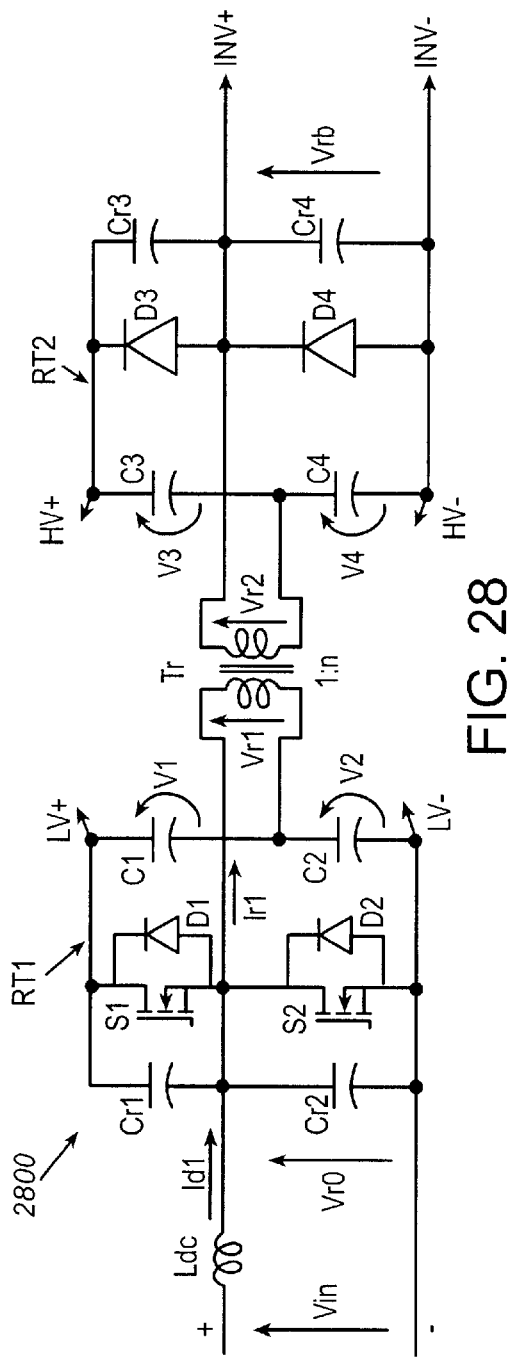
FIG. 28 is a circuit diagram illustrating an alternative unidirectional power converter.
Figure 29:
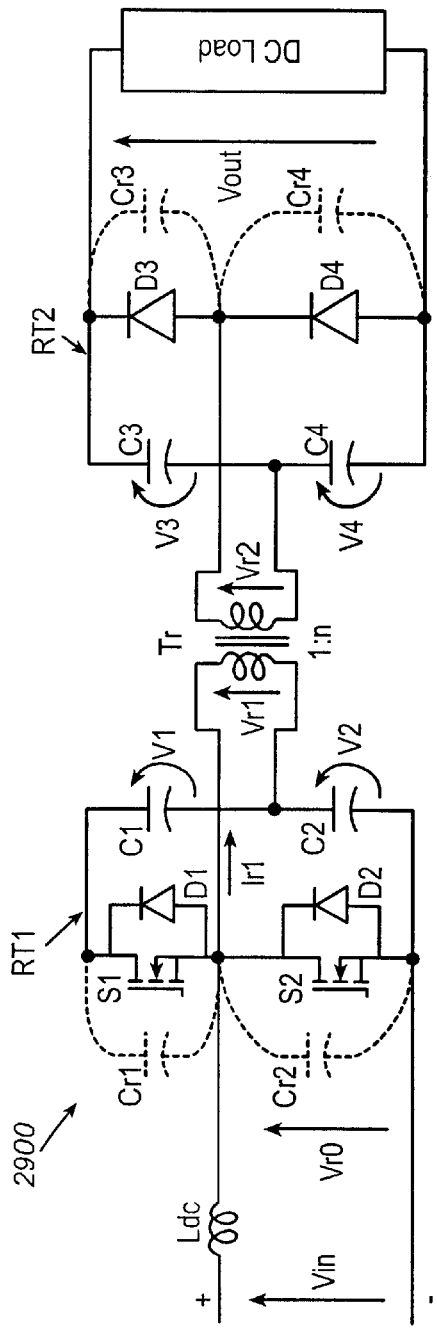
FIG. 29 is a circuit diagram illustrating an alternative unidirectional power converter in which stray capacitance provides the secondary resonant capacitance.

FIG. 28 is a circuit diagram illustrating an alternative unidirectional power converter 2800. In this case, switches S3 and S4 can be omitted and only diodes (D3 and D4) are used on the RT2 side.

The alternative embodiments shown in FIGS. 23–29 illustrate methods for altering the power converter 24, and other combinations and alternatives will be evident to those skilled in the art. For example, combining the teachings illustrated in FIGS. 27 and 28 yields another alternative embodiment 2900 shown in FIG. 29.

Figure 30:
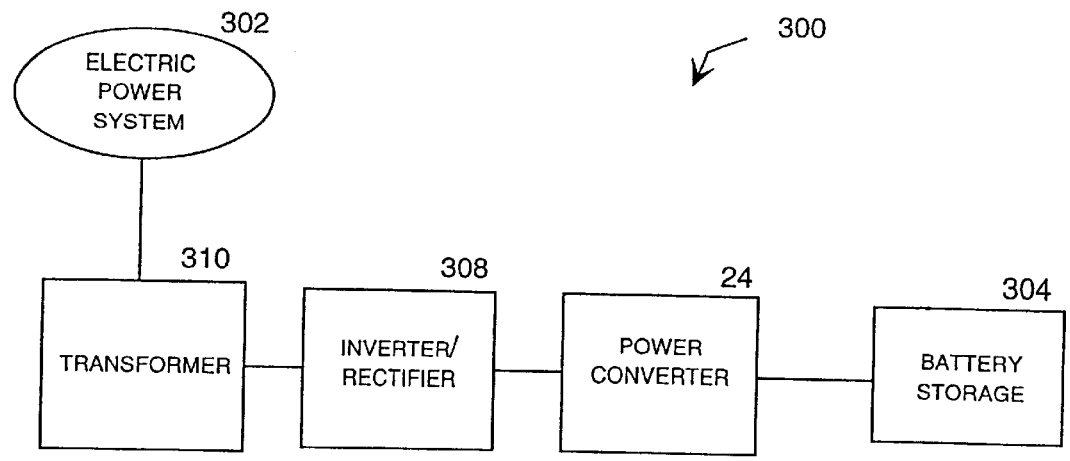
FIG. 30 is a block diagram of a bidirectional load-side electric storage and generation system using a soft-switched power converter.

FIG. 30 is a block diagram of a bidirectional load-side electric storage and generation system 300, which is suitable for providing energy storage and peak load shaving to the electric power grid 302. The electric generation system 300 includes the soft-switched power converter 24, a DC electric power generator, in this case a battery 304, connected to the low-voltage (primary) side of the power converter. The system 300 also includes an inverter/rectifier 308 connected to the high-voltage (secondary) side of the power converter 24. The inverter/rectifier 308 connects the battery 304 to the electric power grid 302 during peak-load periods. During off-peak periods, the inverter/rectifier 308 delivers power from the electric power grid 302 to recharge the battery 304. Thus, the bidirectional power converter 24 shown in FIG. 6 is appropriate for this application.

Figure 31:
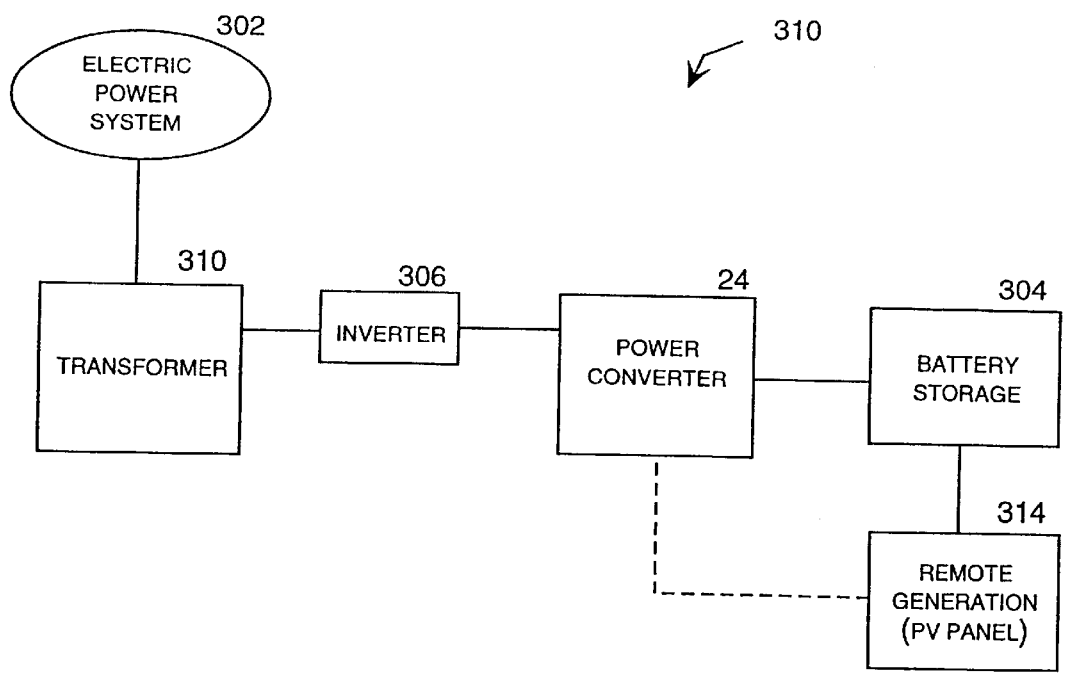
FIG. 31 is a block diagram of a unidirectional load-side electric storage and generation system using a soft-switched power converter.

FIG. 31 is a block diagram of a unidirectional load-side electric storage and generation 310 system using a soft-switched power converter. In this system, the battery 304 is recharged by a local PV panel 314. This obviates the need for power delivery from the electric power grid 302 to the battery 304. For this reason, the unidirectional power converter 2800 shown in FIG. 28 is appropriate for this application. In addition, the local PV panel 314 could be connected directly to the power converter 24, with or without the battery 304 present in the circuit, as indicated by the dashed line. In general, the power converter 2800 may be used to unidirectionally connect any type of DC power source to the electric power grid 302 as a load-side generator, and the power converter 24 may be used to bidirectionally connect any type of DC power source to the electric power grid 302 as a load-side generator.

Figure 32:
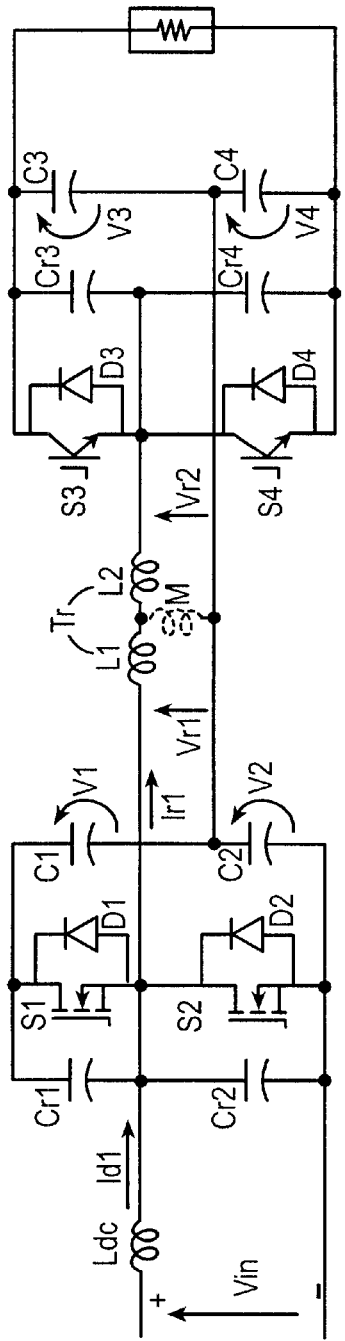
FIG. 32 is a schematic diagram of an illustrative alternative embodiment of an isolated and soft switched power converter.

FIG. 32 is a schematic diagram illustrating the isolated and soft switched power converter 24 in a phase-based control mode. In this control mode, a phase delay across the isolation transformer 104 (i.e., between the voltage waveforms of primary resonant tank circuit 100 and the voltage waveforms of secondary resonant tank circuit 100) is used to control the flow of the output power of the power converter 24. The phase delay is created by gating all four (4) switches, S1, S2, S3, and S4 within the same resonant cycle. Those skilled in the art will appreciate that the current flow diagrams illustrated in FIGS. 14–21 illustrate the current flow for the "ideal" case in which the voltage waveform in the primary resonant tank circuit 100 is in phase with the voltage waveform in the secondary resonant tank circuit 102. For the more realistic alternative, in which a phase shift occurs across the isolation transformer 104, the current states for the secondary resonant tank circuit 102 illustrated in FIGS. 14–21 are delayed by the time associated with the phase shift. The heavier lines in FIGS. 34–42 illustrate the current states for this alternative.

Figure 34:
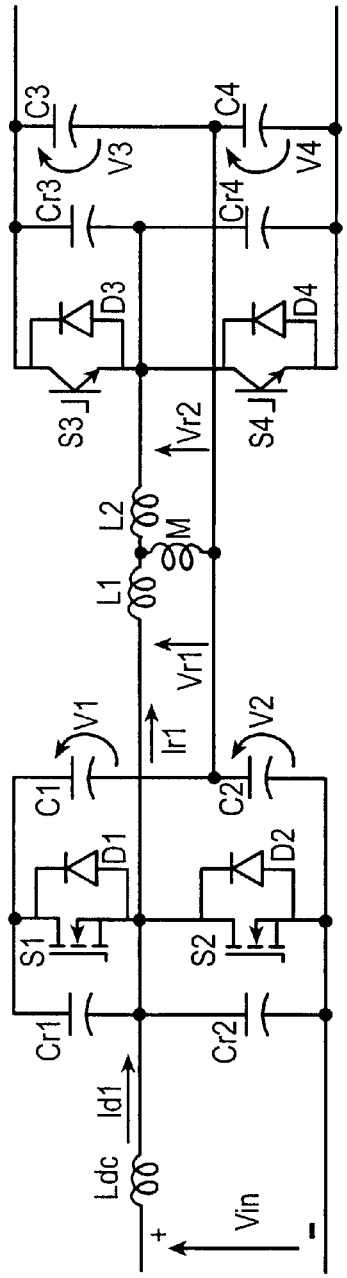
FIG. 34 is a circuit diagram illustrating the current and capacitor charge states in the power converter of FIG. 32 before a first time interval of a resonant cycle.
Figure 33:
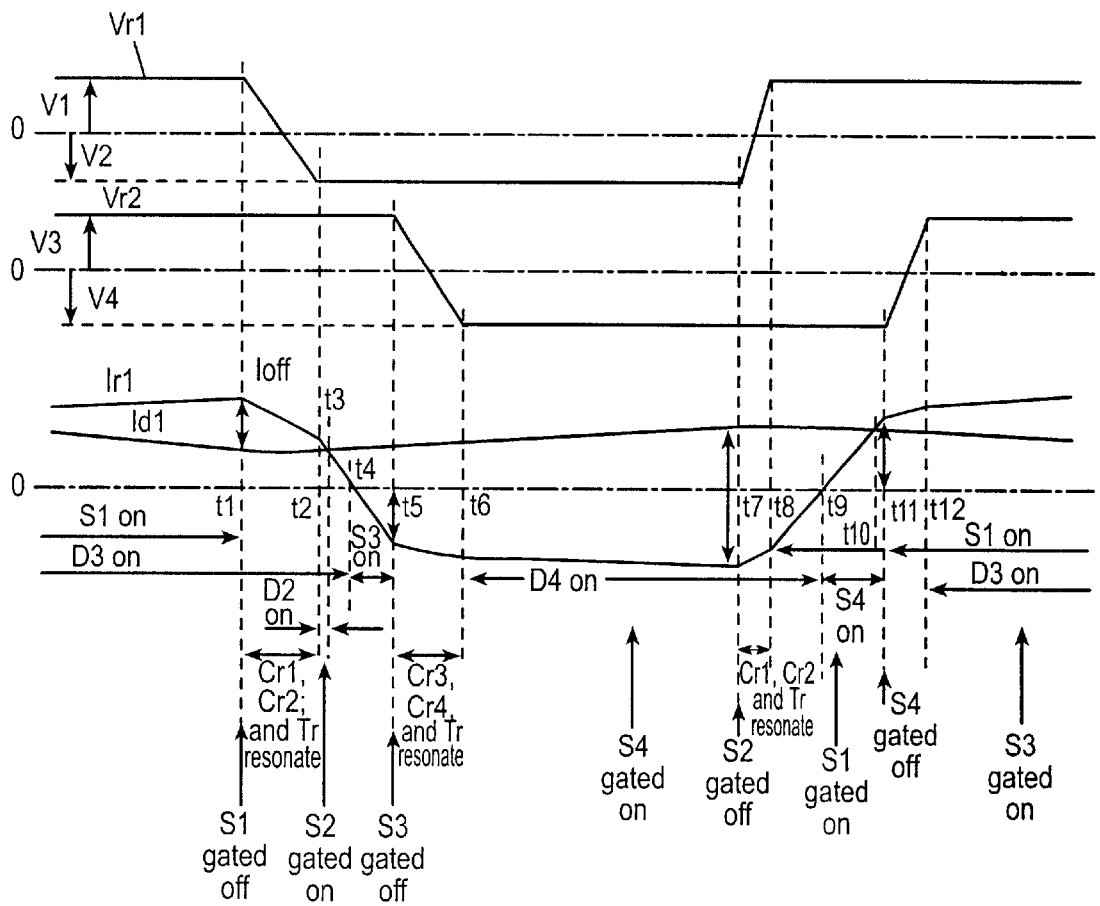
FIG. 33 is a combined timing, voltage and current diagram illustrating the operation of an alternative embodiment of the power converter in FIG. 32.
Figure 35:
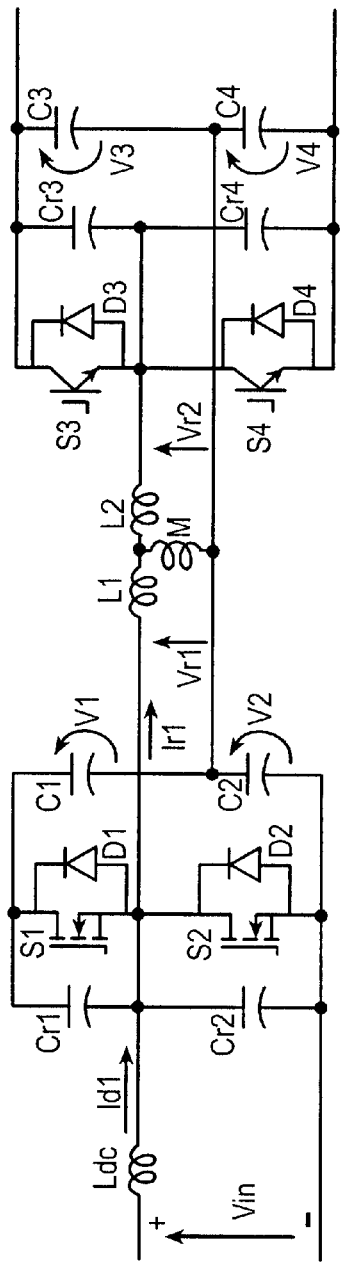
FIG. 35 is a circuit diagram illustrating the current and capacitor charge states in the power converter of FIG. 32 between the first time interval and a second time interval of the resonant cycle.

FIG. 33 is a combined timing, voltage and current diagram illustrating the phase-based mode for the power converter 24. The time from t1 to t12 it is one resonant cycle. Before t1, switch S1 and S3 are on, and the resonant current Ir1 through the transformer Tr increases (i.e., the energy stored in Tr increases) and Vr1 is clamped to tank capacitor voltage V1. This state is shown in FIG. 34. When the current through switch S1, (Id1), reaches a preset turn-off value, Ioff, the switching device S1 is gated off at t1. S1 is zero-voltage turn-off because of capacitor Cr1's zero initial voltage. The resonant capacitors Cr1 and Cr2 and the transformer Tr's equivalent inductance (or stored energy) form a resonant circuit. The equivalent resonant current (Ir1) starts to charge Cr1 and discharge Cr2, that is, voltage Vr1 starts to decrease from t1. This state is shown in FIG. 35.

Figure 36:
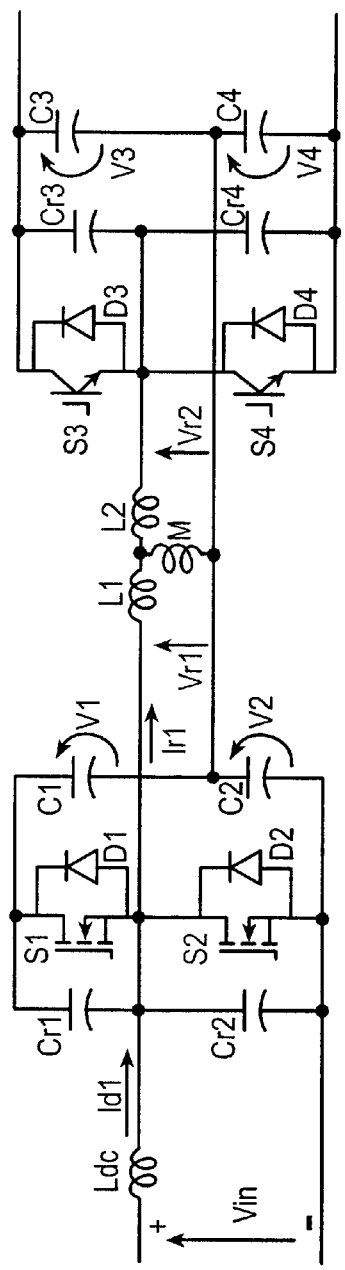
FIG. 36 is a circuit diagram illustrating the current and capacitor charge states in the power converter of FIG. 32 between the second time interval and a fifth time interval of the resonant cycle.

From t1 to t2 it is a free resonant period of Cr1, Cr2, and Tr. When the resonant capacitor (Cr2)'s voltage Vcr2 reaches zero, i.e., Vr1 reaches (–V2) and the equivalent resonant current (Ir1–Id1) attempts to negatively charge resonant capacitor Cr2, diode D2 conducts and clamps Vr1 to negative V2. Here, V2 is the tank capacitor (C2)'s voltage. Current Ir1 starts to decrease at t2 when Vr1 crosses the zero line. During D2's conduction period (t2–t3), switch S2 is gated on, thus accomplishing zero-current and zero-voltage turn-on. Until time t4, diode D3 is conducting. This is shown in FIG. 36.

Figure 37:
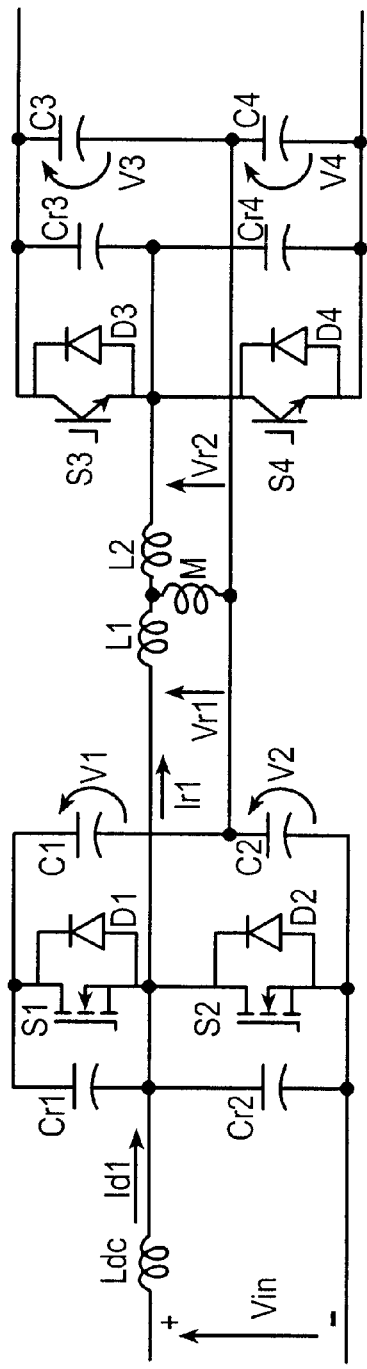
FIG. 37 is a circuit diagram illustrating the current and capacitor charge states in the power converter of FIG. 32 between the fifth time interval and a sixth time interval of the resonant cycle.

The current Ir1 keeps decreasing. When the current –Ir1 reaches the preset turn-off value Ioff, S3 is gated off at t5. A resonant circuit then forms with the resonant capacitors Cr3 and Cr4 and the transformer Tr between t5 and t6, similar to the period of t1 to t2. This state is shown in FIG. 37.

Figure 38:
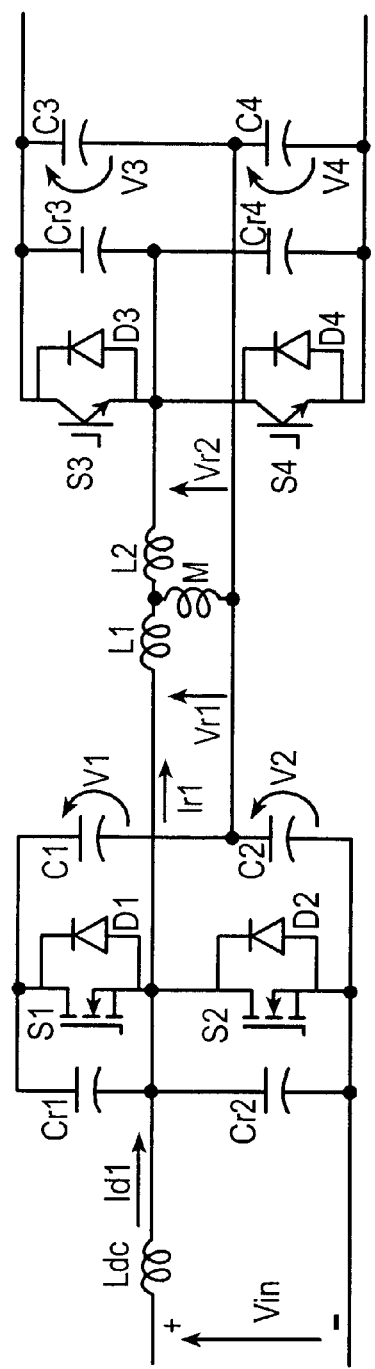
FIG. 38 is a circuit diagram illustrating the current and capacitor charge states in the power converter of FIG. 32 between the sixth time interval and a seventh time interval of the resonant cycle.

The equivalent resonant current −Ir1 charges Cr3 and discharges Cr4, and the output voltage Vr2 decreases. At t6, Vr2 reaches the negative tank capacitor voltage V4, i.e., Cr4 is discharged to zero and Cr3 is charged to the total tank capacitor voltage (V1+V2). D4 conducts and clamps Cr4's voltage; that is, Vr2 is clamped to −V4 through D4. The diode D4 conducts until −Ir1 becomes larger than Id1. At any time during D4's conduction period (t6–t7), S4 is gated on, thus accomplishing zero-current and zero-voltage turn-on. This state is shown in FIG. 38.

Figure 39:
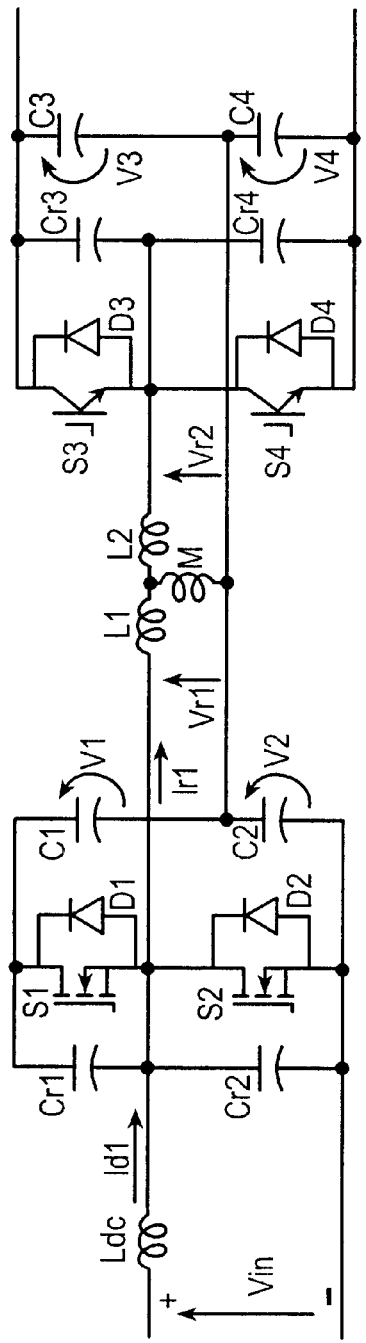
FIG. 39 is a circuit diagram illustrating the current and capacitor charge states in the power converter of FIG. 32 between the seventh time interval and an eighth time interval of the resonant cycle.

At time t7, S2 is gated off. A resonant circuit then forms with the resonant capacitors Cr1 and Cr2 and the transformer Tr between t7 and t8, identical to the period of t1 to t2. Cr1 is discharged to zero, while Cr2 is charged to V1+V2, and Tr is discharged to zero. However, because a charge has built up on Tr, the output voltage Vr1 rises much more rapidly. This is shown in FIG. 39.

Figure 40:
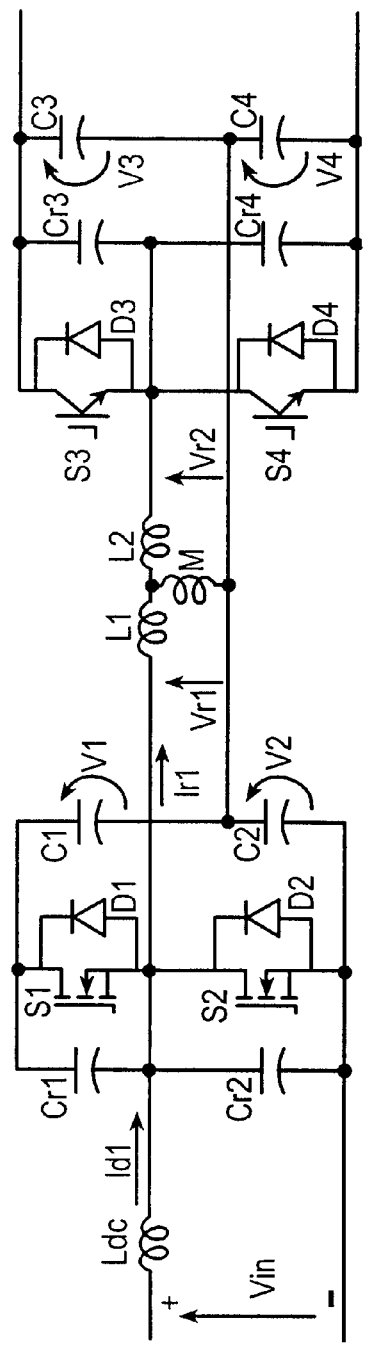
FIG. 40 is a circuit diagram illustrating the current and capacitor charge states in the power converter of FIG. 32 between the eighth time interval and an eleventh time interval of the resonant cycle.

Between t8 and t10, D1 begins conducting. At t9, Ir1 changes polarity again from negative to positive, which causes S4 to start conducting and D4 to stop conducting current. S1 is gated on at any time during D1's conduction period (i.e., between t8 and t10), thereby achieving a zero-current and zero-voltage turn-on. This state is shown in FIG. 40.

Figure 41:
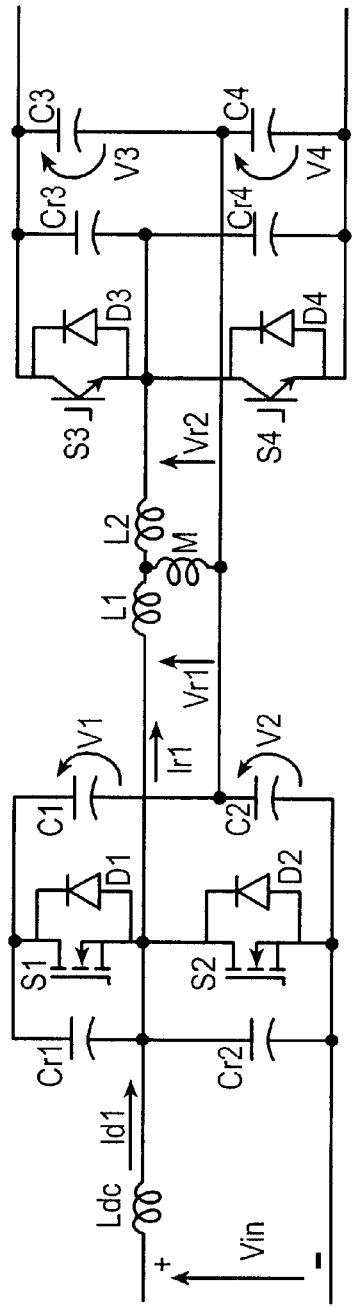
FIG. 41 is a circuit diagram illustrating the current and capacitor charge states in the power converter of FIG. 32 between the eleventh time interval and a twelfth time interval of the resonant cycle.

At t11, S4 is gated off, which causes Cr3 to be discharged to zero, while Cr4 is charged to V3+V4. At time t12, D3 starts conducting, which clamps Vr2 to V3. This is shown in FIG. 41. S3 is gated on any time after t12, thereby again achieving a zero-current, zero-voltage switch.

Figure 42:
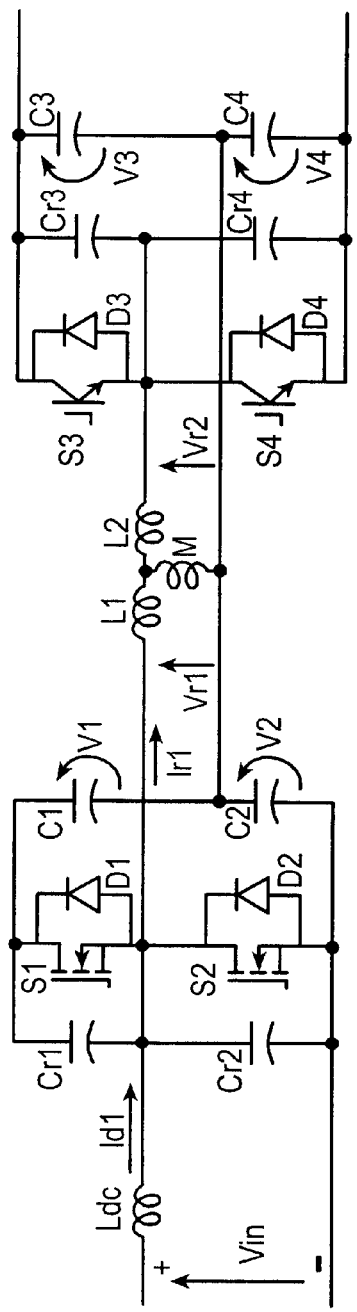
FIG. 42 is a circuit diagram illustrating the current and capacitor charge states in the power converter of FIG. 32 after the twelfth time interval of the resonant cycle.

FIG. 42 is a circuit diagram illustrating the current and capacitor charge states in the power converter 24 after the twelfth time interval of the resonant cycle, which is the same as the first time interval. During this interval S1 and D3 are conducting.

Figure 43:
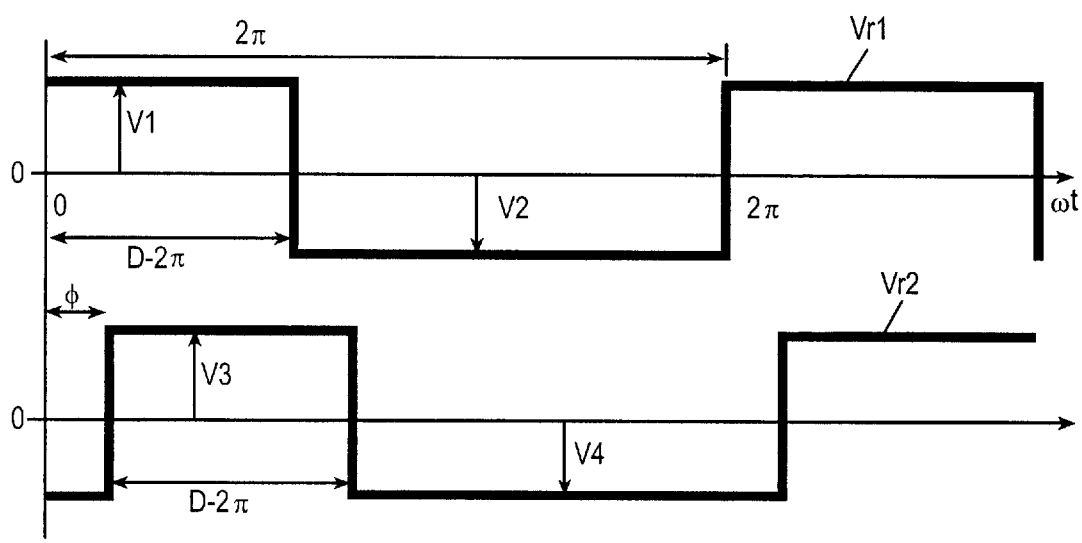
FIG. 43 is a timing diagram of an illustrative control method for operating the power converter in FIG. 32.

FIG. 43 is a timing diagram illustrating the phase shift between the voltage waveforms of the primary resonant tank circuit 100 and the secondary resonant tank circuit 102 for controlling the power converter 24. As noted previously, the switching controller 160 gates all four resonant switches S1, S2, S3 and S4 in this control alternative to obtain the illustrated phase shift between the voltage waveforms for the primary and secondary resonant tank circuits.

Referring again to FIGS. 7–22, the control scheme illustrated by these figures results in a voltage waveform for the primary resonant tank circuit 100 that is very nearly in phase with the voltage waveform for the primary resonant tank circuit 102 (i.e., the voltage shown in FIG. 10 is very nearly in phase with the voltage shown in FIG. 12). In addition, the switching controller 160 shown in FIG. 3 controls both the primary and secondary resonant tank circuits 100, 102 by gating the resonant switches of only one resonant tank circuit, with the switches of the other resonant tank circuit held open. That is, the resonant switches S1 and S2 of the primary resonant tank circuit 100 are gated with the resonant switches S3 and S4 of the secondary resonant tank circuit 102 held open to cause power to flow from the primary side to the secondary side, whereas the resonant switches S3 and S4 of the secondary resonant tank circuit 102 are gated with the resonant switches S1 and S2 of the primary resonant tank circuit 100 held open to cause power to flow from the secondary side to the primary side.

With the power converter 24 operated as described above, the power delivered by the converter can be indirectly controlled by varying the frequency of the resonant cycle. Specifically, the impedance of the isolation transformer 104 varies as a function of the frequency of the resonant cycle (i.e., the impedance increases with increasing frequency), which allows the power flow through the transformer to be controlled by varying the frequency of the resonant cycle. Stated somewhat more conventionally, the isolation transformer 104 can be operated as a variable current "choke" with a frequency-dependent impedance. Thus, controlling the resonant frequency indirectly controls the current flowing through the isolation transformer 104.

In addition, the voltage maintained by the tank capacitors C1, C2, C3 and C4 can be altered by varying the duty cycle of the resonant circuit. Basically, varying the duty cycle alters the charging time for the first and second tank capacitors of each resonant tank circuit, as described previously with reference to FIG. 10. With a 50% duty cycle, for example, the voltage maintained by C1 (V1) will be approximately equal to the voltage maintained by C2 (V2), and the voltage maintained by C3 (V3) will be approximately equal to the voltage maintained by C4 (V4). And varying the duty cycle results in an uneven distribution of the voltage between the first and second tank capacitors of each resonant tank circuit, and also alters the total voltage V1+V2 and V3+V4, within the primary resonant tank circuit 100 and the secondary resonant tank circuit 102, respectively. This allows manipulation of the duty cycle to control the quasi-DC output voltage (V4) as well as the top rail to bottom rail DC output voltage, V3+V4. Thus, controlling the duty cycle indirectly controls the output voltage of the power converter 24.

To summarize, the power flow through the power converter 24 can be controlled using indirect current control and indirect voltage control. Specifically, the output current can be indirectly controlled by manipulating the frequency of the resonant cycle, which alters the impedance of the isolation transformer 104. In addition, the power flow through the power converter 24 can be controlled by manipulating the duty cycle, which alters the output voltage (V4 and V3+V4).

It should be understood, however, that operation of the primary resonant tank circuit 100 in phase with the secondary resonant tank circuit 102, as shown in FIGS. 7–22, requires that the isolation transformer 104 have a very small (i.e., negligible) series or "leakage" inductance. Conversely, a significant leakage inductance in the isolation transformer 104 will temporarily store energy during the resonant cycle, and thus will cause a phase shift between the voltage waveforms in the primary and secondary resonant tank circuits 100, 102. In other words, the in-phase control scheme illustrated in FIGS. 7–22 will only occur if the isolation transformer 104 is effectively an "ideal" transformer with negligible leakage inductance, and thus exhibits no series impedance and no phase shift occurs across the transformer.

The "ideal" isolation transformer 104 assumed in FIGS. 7–22 prevents the storage of energy in the transformer, and the resulting very nearly in-phase operation of the primary and secondary resonant circuits 100, 102. In this operating mode, a very small or negligible phase shift between the voltage waveforms in the primary and secondary resonant circuits 100, 102 results in a large power flow across the power converter 24. In addition, power control for this configuration relies on the indirect current and voltage control methods described above because there is no direct control over the power flow. This may make precisely control and stability of the power flow across the power converter 24 difficult to achieve through manipulation of the gating sequence within the power converter 24 itself.

In addition, as a practical matter the isolation transformer 104 will experience some level of leakage inductance, which will result in some amount of phase shift across the transformer. Moreover, constructing a transformer with nearly ideal characteristics can be prohibitively expensive. For this reason, it may be significant less expensive, and more realistic from a design standpoint, to construct a transformer with a non-negligible amount of leakage inductance. In addition, the indirect control scheme for the power converter 24 described above relies on varying the impedance of the isolation transformer 104, which assumes the presence of series or leakage inductance.

For the reasons described above, the strictly in-phase operating scheme described with reference to FIGS. 7–22 should be considered instructive as an "ideal case" illustration, which may present difficulties in designing a transformer to perform in this manner.

It is also important to recognize that the isolation transformer 104 should be designed to participate in the resonant cycle by temporarily storing energy as power moves across the transformer during the resonant cycle, which results in a phase shift across the transformer as described. Alternatively or additionally, a series inductor may be added to the circuit between the resonant tank circuits 100, 102 to operate as a resonant inductor. Importantly, the phase shift across the isolation transformer 104 and the series resonant inductor, if present, can be directly controlled to control the power flow across the transformer. This allows the power converter 24 to be operated as the power-controlling device through the phase-based control scheme illustrated is FIGS. 33–43. In particular, the phase-based control scheme illustrated is FIGS. 33–43 can be used when the power converter 24 is the power-driving device, and the simpler direct voltage control scheme illustrated in FIGS. 7–22 can be used when the converter follows a controlled power flow imposed by another device.

In FIGS. 32–42, the isolation transformer 104 has been replaced by its equivalent circuit, which includes the series inductors L1 and L2 representing the leakage inductance of the transformer. In addition, the shunt inductor M represents the mutual inductance of the transformer. For the purposes of the phase-based control scheme illustrated in FIGS. 33–43, the series inductors L1 and L2 represent a relatively small inductance that operates as a resonant inductor charging and discharging during each resonant cycle. The shunt inductor M, on the other hand, represents a relatively large mutual inductance whose magnetizing current is substantially low. For this reason, the shunt inductor M may be ignored (i.e., considered an open circuit) for control purposes.

Generally speaking, the phase-based control scheme illustrated in FIGS. 33–43 relies on independent control, or gating on and off, for all four resonant switches S1, S2, S3 and S4. That is, the voltage waveform in each resonant tank circuit 100, 102 is controlled independently to create a controlled phase shift between the waveforms, as shown best in FIGS. 33 and 43. Controlling the gating sequence producing the waveforms results in direct control over the power flow across the isolation transformer 104, in accordance with the following equation:

$$P_0 = \frac{\phi \frac{1}{D}\left[4\pi(1-D) - \phi \frac{1}{D}\right]}{4\pi \omega L} V_{in}^2$$

where, L=L1+L2 and is defined as the leakage inductance of the transformer, $\omega=2\pi f$, where f is the switching or resonant frequency, D is the duty cycle, and $\phi$ is the phase shift between Vr1 and Vr2.

From the above equation, one skilled in the art will appreciate that the output power, $P_0$ may be controlled by regulating (1) the duty cycle, D; (2) the phase shift, $\phi$; (3) the switching frequency, $\omega$; or (4) any combination of the three variables.

With this control scheme, the power flow across the transformer 104 may be increased by increasing the phase shift, and may be decreased by decreasing the phase shift. The resulting phase-based control scheme for the power converter 24 allows precise control over the power flowing across the transformer 104, while simultaneously providing for independent control over the duty cycles and resulting tank voltages for the primary and secondary resonant tank circuits 100, 102. This may be particularly desirable for a fuel-cell application, such as that shown in FIGS. 2A–2B, in which the secondary bus voltage varies significant within the fuel cell's operating range (e.g., 255 to 395 Volts DC) while the primary voltage remains relatively constant at a battery voltage (e.g., 12 or 36 Volts DC). In addition, the phase-based control scheme for the power converter 24 allows precise control over the power flowing across the transformer 104 without having to vary the resonant frequency, which may simplify the design of other components, such as the power controller 26, the isolation transformer 104, and the CMEU controller 36. This may be desirable because these devices may be easier to design and control for operation at a single frequency as opposed to a relatively wide range of operating frequencies.

In sum, the switching controller 160 may implement a variety of techniques for controlling the power flow through the converter 24, including the direct voltage control scheme illustrated in FIGS. 7–22 and the power control scheme illustrated in FIGS. 33–43. These control techniques may be further modified by indirect current control through manipulation of the resonant frequency, and direct voltage control through manipulation of the duty cycle. In the control scheme illustrated in FIGS. 33–43, precise and direct power-flow control is accomplished through controlled gating for all four resonant switches, resulting in manipulation of the phase shift across the isolation transformer 104.

Furthermore, these various control techniques may be employed individually or in combination. In a fuel-cell application, for example, the switching controller 160 may operate at a single resonant frequency to simplify design of the power controller 26 for soft-switching, may use phase control to control the power flow through the converter 24, and may use duty cycle manipulation to control the bus voltage for the fuel cell 54. If desired, the converter 24 may also operate as a variable-frequency device to facilitate frequency-based speed control by the control power controller 26. This may be desirable to assist in other requirements, such as start-up of the power converter 24 and so forth. Those skilled in the art will appreciate that many other control objectives may be accomplished through combinations and modifications of the versatile control techniques described above for the power converter 24 and the alternative configurations illustrated in FIGS. 23–29.

It should be understood that the foregoing pertains only to the preferred embodiments of the present invention, and that numerous changes may be made to the embodiments described herein without departing from the spirit and scope of the invention.

The invention claimed is:

1. An isolated and soft-switched power converter comprising:

an isolation transformer;

primary and secondary resonant tank circuits coupled back-to-back through the isolation transformer;

each resonant tank circuit comprising a pair of resonant capacitances present in series as a resonant leg, a pair of voltage sources connected in series as a tank leg, and a pair of switching devices coupled in series as resonant switches and voltage clamping devices for the resonant leg wherein each of the resonant leg, tank leg, and pair of switching devices and voltage clamping devices are connected in parallel to each other; and a switching controller operable for,
gating off the switching devices to cause a resonant voltage to resonant in each resonant leg, the resonant voltage repeatedly obtaining zero-voltage periods for soft-switching a device powered by the converter, and
gating on the switching devices during zero-current, zero-voltage conditions for soft-switching the switching devices of each resonant tank circuit.

2. The power converter of claim 1, wherein the switching controller is further operable for controlling a flow of electric power between the primary resonant tank circuit and the secondary resonant tank circuit by altering a resonant frequency for gating the switching devices.

3. The power converter of claim 1, wherein the switching controller is further operable for controlling a flow of electric power from the primary resonant tank circuit to the secondary resonant tank circuit by altering a duty cycle defined by a gating sequence for the switching devices of the primary resonant tank circuit, while holding the open the switching devices of the secondary resonant tank circuit.

4. The power converter of claim 3, wherein the switching controller is further operable for controlling a flow of electric power from the secondary resonant tank circuit to the primary resonant tank circuit by altering a duty cycle defined by a gating sequence for the switching devices of the secondary resonant tank circuit, while holding the open the switching devices of the primary resonant tank circuit.

5. The power converter of claim 2, wherein the switching controller is further operable for timing the gating switching devices for the primary and secondary resonant tank circuits to control a flow of electric power between the primary and secondary resonant tank circuits by controlling a phase shift between voltage waveforms generated by the primary and secondary resonant tank circuits.

6. The power converter of claim 1, wherein the switching controller is further operable for controlling a flow of electric power between the primary and secondary resonant tank circuits by altering one or more of the following:
a phase shift between voltage waveforms generated by the primary and secondary resonant tank circuits;
a resonant frequency for gating the switching devices;
a duty cycle defined by a gating sequence for the switching devices of the secondary resonant tank circuit; and
a duty cycle defined by a gating sequence for the switching devices of the primary resonant tank circuit.

7. An electric generation system comprising the power converter of claim 1, further comprising:
a DC electric power generator connected to the primary tank circuit of the power converter; and
an inverter connected to the secondary side of the power converter, the inverter for connecting the system to an electric power grid.

8. The electric generation system of claim 7, wherein the DC electric power generator comprises a battery, further comprising a rectifier connecting the electric power grid to the secondary side of the power converter for recharging the battery.

9. The electric generation system of claim 7, wherein the power converter operates to unidirectionally to deliver power from the DC electric power generator to the electric grid.

10. The electric generation system of claim 7, wherein:
the DC electric power generator comprises a battery and a second DC electric power generator configured to recharge the battery; and
the power converter operates to unidirectionally to deliver power from the DC electric power generator to the electric grid.

11. The power converter of claim 1, wherein the primary resonant tank circuit boosts an input voltage to a higher voltage and the higher voltage is applied to the isolation transformer.

12. The power converter of claim 1, further comprising an inductor coupling an input voltage source to the primary center rail.

13. An isolated and soft-switched power converter, comprising:
an isolation transformer including a primary input node, a primary output node, a secondary input node, and a secondary output node;
a primary resonant tank circuit comprising,
a primary top rail,
a primary center rail,
a primary bottom rail,
a first primary resonant capacitance present between the primary top rail and the primary center rail,
a second primary resonant capacitance present between the primary center rail and the primary bottom rail,
a first primary resonant switch connected between the primary top rail and the primary center rail,
a second primary resonant switch connected between the primary center rail and the primary bottom rail,
a first primary clamping diode connected between the primary high-voltage rail and the primary center rail,
a second primary clamping diode connected between the primary center rail and the primary bottom rail,
a first primary tank capacitor connected between the primary top rail and a primary tap node,
a second primary tank capacitor connected between the primary tap node and the primary bottom rail,
the primary center rail being connected to the primary input node of the isolation transformer, and
the primary tap node being connected to the primary output node of the isolation transformer; and
a secondary resonant tank circuit comprising,
a secondary top rail,
a secondary center rail,
a secondary bottom rail,
a first secondary resonant capacitance present between the secondary top rail and the secondary center rail,
a second secondary resonant capacitance present between the secondary center rail and the secondary bottom rail,
a first secondary clamping diode connected between the secondary top rail and the secondary center rail,
a first secondary tank capacitor connected between the secondary top rail and a secondary tap node,
a second secondary tank capacitor connected between the secondary tap node and the secondary bottom rail,
the secondary center rail being connected to the secondary input node of the isolation transformer, and
the secondary tap node being connected to the secondary output node of the isolation transformer.

14. The power converter of claim 13, wherein the secondary resonant tank circuit further comprises a second secondary clamping diode connected between the secondary center rail and the secondary bottom rail.

15. The power converter of claim 14, wherein the secondary resonant tank circuit further comprises:
  a first secondary resonant switch connected between the secondary top rail and the secondary center rail; and
  a second secondary resonant switch connected between the secondary center rail and the secondary bottom rail.

16. The power converter of claim 13, further comprising:
  a primary bottom-rail terminal connected to the primary bottom rail for connection to a low-potential terminal of a DC voltage source;
  a primary center-rail terminal for connection to a high-potential terminal of the DC voltage source; and
  an inductor connected in series between the primary center-rail terminal and the primary center rail.

17. The power converter of claim 13, further comprising:
  a resonant inductor connected between the primary input node of the isolation transformer and the primary output node of the isolation transformer.

18. The power converter of claim 13, wherein:
  the first primary resonant capacitance comprises a discrete electrical capacitor connected between the primary top rail and the primary center rail; and
  the second primary resonant capacitance comprises a discrete electrical capacitor connected between the primary center rail and the primary bottom rail.

19. The power converter of claim 13, wherein:
  the first primary resonant capacitance consists essentially of stray capacitance inherently present in the first primary resonant switch and the first primary clamping diode; and
  the second primary resonant capacitance consists essentially of stray capacitance inherently present in the second primary resonant switch and the second primary clamping diode.

20. The power converter of claim 13, further comprising a switching controller operable for gating the first and second primary switches to cause:
  a primary resonant voltage to resonate between the first primary resonant capacitance and the second primary resonant capacitance;
  a secondary resonant voltage to resonate between the first secondary resonant capacitance and the second secondary resonant capacitance; and
  the secondary resonant voltage repeatedly obtaining zero-voltage periods for soft-switching a device connected between the secondary center rail and the secondary bottom rail.

21. The power converter of claim 13, further comprising a switching controller operable for soft switching of the first and second primary resonant switches by:
  gating on the first primary resonant switch during current conduction by the first primary clamping diode; and
  gating on the second resonant switch during current conduction by the second primary clamping diode.

22. The power converter of claim 21, wherein the switching controller is further operable for controlling a flow of electric power between the primary resonant tank circuit and the secondary resonant tank circuit by altering a resonant frequency for gating the first and second primary resonant switches.

23. The power converter of claim 21, wherein the switching controller is further operable for controlling a flow of electric power between the primary resonant tank circuit and the secondary resonant tank circuit by altering a duty cycle defined by a gating sequence for the first and second primary resonant switches.

24. The power converter of claim 15, further comprising a switching controller operable for:
  soft switching of the first and second primary resonant switches by gating on the first primary resonant switch during current conduction by the first primary clamping diode, and gating on the second primary resonant switch during current conduction by the second primary clamping diode;
  soft switching of the first and second secondary resonant switches by gating on the first secondary resonant switch during current conduction by the first secondary clamping diode, and gating on the second secondary resonant switch during current conduction by the second secondary clamping diode; and
  timing the gating of the first and second primary resonant switches, and the first and second secondary resonant switches, to control a flow of electric power between the primary resonant tank circuit and the secondary resonant tank circuit by controlling a phase shift between voltage waveforms generated by the primary and secondary resonant tank circuits.

25. The power converter of claim 24, wherein the switching controller is further operable for controlling a flow of electric power between the primary resonant tank circuit and the secondary resonant tank circuit by altering a resonant frequency for gating the first and second primary resonant switches.

26. The power converter of claim 25, wherein the switching controller is further operable for controlling a flow of electric power between the primary resonant tank circuit and the secondary resonant tank circuit by altering a duty cycle defined by a gating sequence for the first and second primary resonant switches.

27. The power converter of claim 14, wherein:
  the first secondary resonant capacitance comprises a discrete electrical capacitor connected between the secondary top rail and the secondary center rail; and
  the second secondary resonant capacitance comprises a discrete electrical capacitor connected between the secondary center rail and the secondary bottom rail.

28. The power converter of claim 14, wherein:
  the first secondary resonant capacitance consists essentially of stray capacitance inherently present in the first secondary clamping diode; and
  the second secondary resonant capacitance consists essentially of stray capacitance inherently present in the second secondary clamping diode.

29. The power converter of claim 13, wherein the primary resonant tank circuit boosts an input voltage to a higher voltage and the higher voltage is applied to the isolation transformer.

30. An isolated and soft-switched power converter, comprising:
  an isolation transformer including a primary input node, a primary output node, a secondary input node, and a secondary output node;
  a primary resonant tank circuit comprising,
    a primary top rail,
    a primary center rail,
    a primary bottom rail,
    a first primary resonant capacitance present between the primary top rail and the primary center rail,
    a second primary resonant capacitance present between the primary center rail and the primary bottom rail, a first primary resonant switch connected between the primary top rail and the primary center rail, a second primary resonant switch connected between the primary center rail and the primary bottom rail, a first primary clamping diode connected between the primary top rail and the primary center rail, a second primary clamping diode connected between the primary center rail and the primary top rail, a first primary tank capacitor connected between the primary top rail and a primary bottom node, a second primary tank capacitor connected between the primary tap node and the primary bottom rail, the primary center rail being connected to the primary input node of the isolation transformer, the primary tap node being connected to the primary output node of the isolation transformer, a primary bottom-rail terminal connected to the primary bottom rail for connection to a low-potential terminal of a DC voltage source;

a primary center-rail terminal for connection to a high-potential terminal of the DC voltage source, and an inductor connected in series between the primary center-rail terminal and the primary center rail;

a secondary resonant tank circuit comprising, a secondary top rail, a secondary center rail, a secondary bottom rail, a first secondary resonant capacitance present between the secondary top rail and the secondary center rail, a second secondary resonant capacitance present between the secondary center rail and the secondary bottom rail, a first secondary clamping diode connected between the secondary top rail and the secondary center rail, a second secondary clamping diode connected between the secondary center rail and the secondary bottom rail, a first secondary resonant switch connected between the secondary top rail and the secondary center rail, a second secondary resonant switch connected between the secondary center rail and the secondary bottom rail, a first secondary tank capacitor connected between the secondary top rail and a secondary tap node, a second secondary tank capacitor connected between the secondary tap node and the secondary bottom rail, the secondary center rail being connected to the secondary input node of the isolation transformer, and the secondary tap node being connected to the secondary output node of the isolation transformer; and a switching controller operable for gating the first and second primary switches to cause a primary resonant voltage to resonate between the first primary resonant capacitance and the second primary resonant capacitance, a secondary resonant voltage to resonate between the first secondary resonant capacitance and the second secondary resonant capacitance, and the secondary resonant voltage repeatedly obtaining zero-voltage intervals for soft-switching a device connected between the secondary center rail and the secondary bottom rail.

31. The power converter of claim 30, wherein the switching controller is further operable for soft switching of the first and second primary resonant switches by:

gating on the first resonant switch during current conduction by the first primary clamping diode; and gating on the second resonant switch during current conduction by the second primary clamping diode.

* * * * *